United States Patent
White et al.

(10) Patent No.: US 10,664,823 B2
(45) Date of Patent: May 26, 2020

(54) METHOD FOR USING A USER INTERFACE CONTROL TO TRANSFER AN ID FROM A SERVER

(71) Applicant: CashStar, Inc., Portland, ME (US)

(72) Inventors: Richardson Charles White, Cohasset, MA (US); David D. Stone, Falmouth, ME (US)

(73) Assignee: CashStar, Inc., Portland, ME (US)

( * ) Notice: Subject to any disclaimer, the term of this patent is extended or adjusted under 35 U.S.C. 154(b) by 49 days.

(21) Appl. No.: 14/788,047

(22) Filed: Jun. 30, 2015

(65) Prior Publication Data
US 2015/0302387 A1 Oct. 22, 2015

Related U.S. Application Data

(63) Continuation of application No. 13/928,849, filed on Jun. 27, 2013, now abandoned.
(Continued)

(51) Int. Cl.
*G06Q 20/36* (2012.01)
*G06Q 20/32* (2012.01)
(Continued)

(52) U.S. Cl.
CPC ......... *G06Q 20/3223* (2013.01); *G06Q 20/02* (2013.01); *G06Q 20/353* (2013.01);
(Continued)

(58) Field of Classification Search
CPC .. G06Q 20/3223; G06Q 20/02; G06Q 20/353; G06Q 20/36; G06Q 20/367; H04L 67/02
See application file for complete search history.

(56) References Cited

U.S. PATENT DOCUMENTS

| 4,800,543 A | 1/1989 | Lyndon-James |
| 4,926,480 A | 5/1990 | Chaum |

(Continued)

FOREIGN PATENT DOCUMENTS

| EP | 2464085 A1 | 6/2012 |
| KR | 10-2001-0000053 | 1/2001 |

(Continued)

OTHER PUBLICATIONS

Authors: Evelina Pencheva, Ivaylo Atanasov Title: "Integration of Services Implemented on Different Service Platforms" Bulgarian Academy of Sciences. Cybernetics and Information Technologies • vol. 9, No. 3. 2009 (Year: 2009).*

(Continued)

*Primary Examiner* — Kito R Robinson
*Assistant Examiner* — Tony P Kanaan
(74) *Attorney, Agent, or Firm* — Panitch Schwarze Belisario & Nadel LLP

(57) ABSTRACT

A method is disclosed for storing an electronic gift card (eGC) on a portable electronic device. The method includes: receiving a request for a web page hosted by a prepaid instrument provider server, the request including a uniform resource locator (URL) associated with a selected eGC stored on the server; associating with the selected eGC a unique identification code and a URL link to the selected eGC; sending the web page with a user-interface control that, when selected, causes the selected eGC to be added to an electronic passbook on the portable electronic device; responsive to selection of the user-interface control, receiving the unique identification code associated with the selected eGC; responsive to receiving the unique identification code, creating an electronic passbook file for the selected eGC; and, communicating the electronic passbook (Continued)

file for adding as a representation of the selected eGC to the electronic passbook.

2 Claims, 9 Drawing Sheets

Related U.S. Application Data

(60) Provisional application No. 61/699,704, filed on Sep. 11, 2012.

(51) Int. Cl.
*G06Q 20/34* (2012.01)
*G06Q 20/02* (2012.01)
*H04L 29/08* (2006.01)

(52) U.S. Cl.
CPC ........... *G06Q 20/36* (2013.01); *G06Q 20/367* (2013.01); *H04L 67/02* (2013.01)

(56) References Cited

U.S. PATENT DOCUMENTS

| | | | |
|---|---|---|---|
| 5,276,311 A | 1/1994 | Hennige | |
| 5,557,516 A | 9/1996 | Hogan | |
| 5,793,027 A | 8/1998 | Baik | |
| 6,014,648 A | 1/2000 | Brennan | |
| 6,122,403 A | 9/2000 | Rhoads | |
| 6,169,890 B1 | 1/2001 | Vatanen | |
| 6,230,267 B1 | 5/2001 | Richards | |
| 6,311,171 B1 | 10/2001 | Dent | |
| 6,609,113 B1 | 8/2003 | O'Leary | |
| 6,704,714 B1* | 3/2004 | O'Leary | G06Q 20/04 705/39 |
| 6,793,135 B1* | 9/2004 | Ryoo | G06Q 20/02 235/380 |
| 6,829,586 B2 | 12/2004 | Postrel | |
| 6,957,776 B1 | 10/2005 | Ng | |
| 7,003,495 B1 | 2/2006 | Burger | |
| 7,010,512 B1 | 3/2006 | Gillin | |
| 7,177,838 B1* | 2/2007 | Ling | G06Q 20/06 705/41 |
| 7,249,099 B2 | 7/2007 | Ling | |
| 7,254,557 B1 | 8/2007 | Gillin | |
| 7,293,034 B2* | 11/2007 | Paya | G06F 17/3089 |
| 7,328,189 B2* | 2/2008 | Ling | G06Q 20/04 705/41 |
| 7,376,621 B1* | 5/2008 | Ling | G06Q 20/04 705/30 |
| 7,508,954 B2 | 3/2009 | Lev | |
| 7,529,563 B1* | 5/2009 | Pitroda | G06Q 20/02 455/406 |
| 7,685,265 B1* | 3/2010 | Nguyen | G06F 9/542 709/206 |
| 7,706,831 B2 | 4/2010 | Richardson et al. | |
| 7,711,620 B2 | 5/2010 | Abifaker | |
| 7,743,980 B2 | 6/2010 | de Sylva | |
| 7,873,742 B1* | 1/2011 | Orvendal | H04L 67/303 707/613 |
| 7,877,694 B2* | 1/2011 | Antonelli | H04L 29/06 715/714 |
| 7,953,654 B2 | 5/2011 | Abifaker | |
| 7,992,774 B2 | 8/2011 | Lynch et al. | |
| 8,046,266 B1* | 10/2011 | Geller | G06Q 30/02 705/14.1 |
| 8,200,544 B1* | 6/2012 | Jones | G06Q 30/0207 705/26.1 |
| 8,290,858 B1* | 10/2012 | Ankarath | G06Q 40/00 705/35 |
| 8,313,037 B1 | 11/2012 | Humphrey | |
| 8,376,239 B1 | 2/2013 | Humphrey | |
| 8,396,772 B2 | 3/2013 | Abifaker | |
| 8,396,810 B1* | 3/2013 | Cook | G06Q 30/06 705/67 |
| 8,423,457 B1 | 4/2013 | Schattauer | |
| 8,442,866 B2* | 5/2013 | Stone | G06Q 30/0603 705/26.1 |
| 8,452,705 B2* | 5/2013 | Boal | G06Q 20/0652 705/40 |
| 8,521,629 B2* | 8/2013 | Abifaker | G06Q 20/10 705/1.1 |
| 8,554,655 B2 | 10/2013 | Abifaker | |
| 8,577,803 B2* | 11/2013 | Chatterjee | G06Q 20/36 705/41 |
| 8,589,296 B2* | 11/2013 | Boal | G06Q 20/0652 705/40 |
| 8,655,762 B2 | 2/2014 | Abifaker | |
| 8,720,771 B2* | 5/2014 | MacKinnon Keith | G06K 5/00 235/375 |
| 8,874,481 B2* | 10/2014 | Boal | G06Q 20/0652 705/40 |
| 2001/0037312 A1* | 11/2001 | Gray | G06Q 20/00 705/67 |
| 2002/0004783 A1* | 1/2002 | Paltenghe | G06F 21/6209 705/41 |
| 2002/0038287 A1 | 3/2002 | Villaret | |
| 2002/0047044 A1 | 4/2002 | Orus et al. | |
| 2002/0077978 A1* | 6/2002 | O'Leary | G06Q 20/04 705/40 |
| 2002/0077993 A1* | 6/2002 | Immonen | G06Q 20/04 705/77 |
| 2002/0082931 A1* | 6/2002 | Siegel | G06F 17/30879 705/26.62 |
| 2002/0116271 A1* | 8/2002 | Mankoff | G06Q 20/20 705/14.25 |
| 2002/0120563 A1 | 8/2002 | McWilliam et al. | |
| 2002/0133424 A1 | 9/2002 | Joao | |
| 2002/0133467 A1* | 9/2002 | Hobson | G06Q 20/02 705/64 |
| 2003/0065624 A1 | 4/2003 | James et al. | |
| 2003/0097444 A1 | 5/2003 | Dutta | |
| 2003/0140004 A1* | 7/2003 | O'Leary | G06Q 20/04 705/39 |
| 2004/0011866 A1 | 1/2004 | Saad | |
| 2004/0030598 A1* | 2/2004 | Boal | G06Q 30/02 705/14.25 |
| 2004/0049420 A1* | 3/2004 | Carlson | G06Q 30/02 705/14.1 |
| 2004/0169722 A1 | 9/2004 | Pena | |
| 2005/0018883 A1 | 1/2005 | Scott | |
| 2005/0049964 A1 | 3/2005 | Winterer | |
| 2005/0071179 A1 | 3/2005 | Peters | |
| 2005/0116026 A1 | 6/2005 | Burger | |
| 2005/0144266 A1* | 6/2005 | Antonelli | H04L 29/06 709/223 |
| 2005/0187895 A1* | 8/2005 | Paya | G06F 21/41 |
| 2005/0199712 A1 | 9/2005 | Rosenblatt | |
| 2005/0278188 A1 | 12/2005 | Thomson et al. | |
| 2006/0100927 A1* | 5/2006 | Zormati | G06Q 20/342 705/14.26 |
| 2006/0161478 A1 | 7/2006 | Turner et al. | |
| 2006/0253335 A1 | 11/2006 | Keena | |
| 2006/0278704 A1* | 12/2006 | Saunders | G06Q 20/10 235/382 |
| 2007/0011060 A1* | 1/2007 | Karas | G06Q 10/101 705/14.27 |
| 2007/0063020 A1 | 3/2007 | Barrafato | |
| 2007/0108268 A1 | 5/2007 | Graves et al. | |
| 2007/0150411 A1* | 6/2007 | Addepalli | G06Q 20/10 705/39 |
| 2007/0168332 A1 | 7/2007 | Bussard | |
| 2007/0203788 A1* | 8/2007 | Andalib | G06Q 30/0208 705/14.11 |
| 2007/0234224 A1* | 10/2007 | Leavitt | B60K 35/00 715/762 |
| 2007/0282739 A1 | 12/2007 | Thomsen | |
| 2008/0041936 A1 | 2/2008 | Vawter | |
| 2008/0041937 A1 | 2/2008 | Vawter | |
| 2008/0048022 A1* | 2/2008 | Vawter | G06Q 20/32 235/380 |

(56) References Cited

U.S. PATENT DOCUMENTS

| | | | |
|---|---|---|---|
| 2008/0052164 A1* | 2/2008 | Abifaker | G06Q 20/10 705/14.27 |
| 2008/0091602 A1 | 4/2008 | Gray | |
| 2008/0208742 A1* | 8/2008 | Arthur | G06Q 20/105 705/41 |
| 2008/0255942 A1* | 10/2008 | Craft | G06Q 20/045 705/14.26 |
| 2009/0037326 A1* | 2/2009 | Chitti | G06Q 20/10 705/39 |
| 2009/0043658 A1 | 2/2009 | Webb | |
| 2009/0085873 A1 | 4/2009 | Betts | |
| 2009/0094134 A1* | 4/2009 | Toomer | G06Q 10/10 705/26.1 |
| 2009/0104888 A1 | 4/2009 | Cox | |
| 2009/0132415 A1* | 5/2009 | Davis | G06Q 20/10 705/43 |
| 2009/0138396 A1* | 5/2009 | Boal | G06Q 20/0652 705/39 |
| 2009/0144161 A1 | 6/2009 | Fisher | |
| 2009/0182663 A1 | 7/2009 | Hurst | |
| 2009/0192928 A1* | 7/2009 | Abifaker | G06Q 30/02 705/35 |
| 2009/0198615 A1 | 8/2009 | Emerson | |
| 2009/0234751 A1* | 9/2009 | Chan | G06Q 20/145 705/26.1 |
| 2009/0307132 A1 | 12/2009 | Phillips | |
| 2010/0041368 A1* | 2/2010 | Kumar | G06Q 20/02 455/407 |
| 2010/0049598 A1* | 2/2010 | Burst | G06Q 30/02 705/14.1 |
| 2010/0057552 A1 | 3/2010 | O'Leary | |
| 2010/0063906 A1* | 3/2010 | Nelsen | G06Q 20/28 705/30 |
| 2010/0076833 A1* | 3/2010 | Nelsen | G06Q 20/06 705/14.25 |
| 2010/0082444 A1* | 4/2010 | Lin | G06Q 20/042 705/17 |
| 2010/0082448 A1* | 4/2010 | Lin | G06F 21/10 705/26.1 |
| 2010/0082487 A1* | 4/2010 | Nelsen | G06Q 20/10 705/44 |
| 2010/0082489 A1* | 4/2010 | Lin | G06Q 20/123 705/59 |
| 2010/0088188 A1* | 4/2010 | Kumar | G06Q 20/10 705/17 |
| 2010/0088225 A1* | 4/2010 | Forsberg | G06Q 20/10 705/39 |
| 2010/0088237 A1 | 4/2010 | Wankmueller | |
| 2010/0114731 A1* | 5/2010 | Kingston | G06Q 20/10 705/26.1 |
| 2010/0161443 A1* | 6/2010 | Ganz | G06Q 20/04 705/26.1 |
| 2010/0200651 A1* | 8/2010 | Wolfe | G06Q 20/10 235/379 |
| 2010/0200654 A1* | 8/2010 | Wolfe | G06Q 20/06 235/379 |
| 2010/0223152 A1 | 9/2010 | Emerson | |
| 2010/0250436 A1 | 9/2010 | Loevenguth | |
| 2010/0280921 A1* | 11/2010 | Stone | G06Q 30/0603 705/27.1 |
| 2010/0299194 A1* | 11/2010 | Snyder | G06Q 20/10 705/14.13 |
| 2010/0306113 A1 | 12/2010 | Gray | |
| 2010/0314276 A1 | 12/2010 | Wilen | |
| 2011/0025037 A1 | 2/2011 | Wilen | |
| 2011/0029364 A1* | 2/2011 | Roeding | G01S 5/18 705/14.16 |
| 2011/0105022 A1 | 5/2011 | Vawter | |
| 2011/0106698 A1* | 5/2011 | Isaacson | G06Q 20/105 705/41 |
| 2011/0112919 A1* | 5/2011 | Gray | G06Q 20/12 705/17 |
| 2011/0119156 A1 | 5/2011 | Hwang | |
| 2011/0145695 A1 | 6/2011 | Matsui | |
| 2011/0208652 A1 | 8/2011 | O'Leary | |
| 2011/0208656 A1* | 8/2011 | Alba | G06Q 20/12 705/65 |
| 2011/0238571 A1 | 9/2011 | O'Leary | |
| 2011/0246362 A1 | 10/2011 | O'Leary | |
| 2011/0251962 A1* | 10/2011 | Hruska | G06Q 20/0457 705/72 |
| 2011/0276474 A1 | 11/2011 | Portillo | |
| 2011/0314549 A1 | 12/2011 | Song | |
| 2011/0320314 A1 | 12/2011 | Brown | |
| 2012/0011063 A1* | 1/2012 | Killian | G06Q 20/105 705/41 |
| 2012/0018501 A1 | 1/2012 | Wilen | |
| 2012/0022958 A1 | 1/2012 | De Sylva | |
| 2012/0024945 A1 | 2/2012 | Jones | |
| 2012/0066043 A1* | 3/2012 | Carmichael | G06Q 20/0457 705/14.23 |
| 2012/0143752 A1 | 6/2012 | Wong | |
| 2012/0150601 A1 | 6/2012 | Fisher | |
| 2012/0179577 A1* | 7/2012 | Isaacson | G06Q 30/0207 705/26.41 |
| 2012/0209688 A1* | 8/2012 | Lamothe | G06Q 30/02 705/14.27 |
| 2012/0209749 A1* | 8/2012 | Hammad | G06Q 30/06 705/27.1 |
| 2012/0232968 A1 | 9/2012 | Calman | |
| 2012/0234912 A1* | 9/2012 | Yankovich | G06Q 30/06 235/379 |
| 2012/0271712 A1* | 10/2012 | Katzin | G06Q 30/06 705/14.51 |
| 2012/0290449 A1* | 11/2012 | Mullen | G06Q 10/00 705/27.2 |
| 2012/0296741 A1* | 11/2012 | Dykes | G06Q 20/322 705/14.53 |
| 2013/0008947 A1 | 1/2013 | Aidasani | |
| 2013/0024371 A1* | 1/2013 | Hariramani | G06Q 20/36 705/41 |
| 2013/0054454 A1* | 2/2013 | Purves | H04L 67/306 705/41 |
| 2013/0054470 A1* | 2/2013 | Campos | G06Q 20/36 705/67 |
| 2013/0060665 A1 | 3/2013 | Davis | |
| 2013/0073429 A1* | 3/2013 | Narendra | G06Q 30/06 705/26.41 |
| 2013/0085941 A1* | 4/2013 | Rosenblatt | G06Q 20/1085 705/44 |
| 2013/0091042 A1 | 4/2013 | Shah | |
| 2013/0097078 A1* | 4/2013 | Wong | G06Q 20/027 705/44 |
| 2013/0117646 A1* | 5/2013 | Hansen | G06Q 30/0225 715/205 |
| 2013/0126607 A1* | 5/2013 | Behjat | G06Q 20/3274 235/380 |
| 2013/0144732 A1* | 6/2013 | Rothschild | G06Q 20/0457 705/17 |
| 2013/0159178 A1* | 6/2013 | Colon | G06Q 20/36 705/41 |
| 2013/0166332 A1* | 6/2013 | Hammad | G06Q 40/10 705/5 |
| 2013/0167135 A1* | 6/2013 | Neumann | G06F 9/44536 717/174 |
| 2013/0179341 A1* | 7/2013 | Boudreau | G06Q 20/105 705/41 |
| 2013/0198068 A1* | 8/2013 | Boal | G06Q 20/0652 705/41 |
| 2013/0204785 A1* | 8/2013 | Monk | G06Q 20/32 705/44 |
| 2013/0211890 A1* | 8/2013 | Heitmueller | G06Q 30/0207 705/14.13 |
| 2013/0211970 A1* | 8/2013 | Glass | G06Q 30/0641 705/27.1 |
| 2013/0254063 A1* | 9/2013 | Stone | G06Q 30/0603 705/26.5 |

(56) References Cited

U.S. PATENT DOCUMENTS

| | | | | |
|---|---|---|---|---|
| 2013/0254064 | A1* | 9/2013 | Stone | G06Q 30/0603 705/26.5 |
| 2013/0256403 | A1* | 10/2013 | MacKinnon Keith | G06K 5/00 235/375 |
| 2013/0268413 | A1* | 10/2013 | Burr | G06Q 30/06 705/27.1 |
| 2013/0304559 | A1* | 11/2013 | Stone | G06Q 20/06 705/14.33 |
| 2013/0325567 | A1* | 12/2013 | Bradley | G06Q 30/02 705/14.1 |
| 2013/0325671 | A1* | 12/2013 | Glass | G06Q 30/0641 705/27.1 |
| 2013/0334308 | A1* | 12/2013 | Priebatsch | G06Q 90/00 235/383 |
| 2013/0346305 | A1* | 12/2013 | Mendes | G06Q 20/351 705/41 |
| 2014/0046837 | A1* | 2/2014 | Metral | G06Q 40/02 705/41 |
| 2014/0058929 | A1* | 2/2014 | Boal | G06Q 20/0652 705/39 |
| 2014/0058936 | A1 | 2/2014 | Ren | |
| 2014/0074704 | A1 | 3/2014 | White | |
| 2014/0122293 | A1* | 5/2014 | Narendra | G06Q 30/06 705/26.8 |
| 2014/0122327 | A1* | 5/2014 | Aleles | G06Q 20/381 705/39 |
| 2014/0136349 | A1* | 5/2014 | Dave | G06Q 20/20 705/16 |
| 2014/0195425 | A1* | 7/2014 | Campos | G06Q 20/20 705/41 |
| 2015/0006271 | A1* | 1/2015 | Oppenheim | G06Q 30/06 705/14.23 |
| 2015/0019944 | A1* | 1/2015 | Kalgi | G06F 16/958 715/205 |
| 2015/0088753 | A1* | 3/2015 | Van Der Schueren | G06Q 20/351 705/67 |
| 2015/0106225 | A1* | 4/2015 | Glass | G06Q 20/12 705/26.7 |
| 2015/0206134 | A1* | 7/2015 | Rodning | G06Q 20/354 705/41 |

FOREIGN PATENT DOCUMENTS

| | | |
|---|---|---|
| KR | 10-2001-0100653 | 11/2001 |
| KR | 10-2002-0004010 | 1/2002 |
| WO | 2009/073451 | 6/2009 |

OTHER PUBLICATIONS

American Express: American Express Business Gift Cards & Corporate Gift Cards [online] [retrieved on Jul. 11, 2012]. Retrieved from the Internet:<URL: https://www311.americanexpress.com/BOLWeb/bolfeOrder.do?request_type=orderProduct&promotion=ACP&program=ACPBUS&selleracctnbr=6430098999I&intlink=GC:HmPg:BGC > (6 pages).

American Express: FAQs—American Express Gift Cards [online] [retrieved on Jul. 11, 2012]. Retrieved from the Internet:<URL: https://www.americanexpress.com/us/content/prepaid/gift-cards/faqs.html> (17 pages).

Gilgoff, H. "A Bank's Gift Cards Cost Extra." Newsday (Nassau and Suffolk edition). Long Island, New York: Dec. 4, 2005 (p. A. 66).

Groupon: FAQ [online] [retrieved on Jul. 11, 2012]. Retrieved from the Internet:<URL: http://www.groupon.com/faq > (12 pages).

Groupon: Give the gift of Groupon [online] [retrieved on Jul. 11, 2012]. Retrieved from the Internet:<URL: http://www.groupon.com/giftcards > (3 pages).

Groupon: Groupon Now!™ Frequently Asked Questions [online] [retrieved on Jul. 11, 2012]. Retrieved from the Internet:<URL: http://www.groupon.com/pages/groupon-now-faq> (6 pages).

Groupon: How to Redeem Groupons [online] [retrieved on Jul. 11, 2012]. Retrieved from the Internet:<URL: http://www.groupon.com/pages/how-to-redeem> (5 pages).

Higgins, M. "Short on Gift Ideas?. . . Think Plastic." Wall Street Journal (Eastern edition). New York, New York: Nov. 13, 2002 (p. D2).

Webcertificate(TM)—The Web's First Universally Accepted Gift Certificate, PR Newswire. New York: Nov. 16, 1998. p. 1, downloaded from ProQuestDirect on the Internet on May 6, 2012, 3 pages.

Won, Shirley, Got $100,000? Four Seasons has a gift card for you. The Globe and Mail [Toronto, Ont] Dec. 5, 2006: B.1, downloaded from ProQuestDirect on the Internet on Jan. 29, 2013.

International Search Report corresponding to co-pending International Patent Application Serial No. PCT/US2013/058272, European Patent Office, dated Jan. 3, 2014; (4 pages).

International Written Opinion corresponding to co-pending International Patent Application Serial No. PCT/US2013/058272, European Patent Office, dated Jan. 3, 2014; (9 pages).

Examination Report No. 1 dated Apr. 6, 2018 in Australian application No. 2013315844.

Office Action dated Aug. 22, 2018 in AU Application No. 2013315844.

\* cited by examiner

METHOD FOR USING A USER INTERFACE CONTROL TO TRANSFER AN ID FROM A SERVER

CLAIM OF PRIORITY AND CROSS-REFERENCE TO RELATED APPLICATION

This application is a continuation of U.S. patent application Ser. No. 13/928,849, filed Jun. 27, 2013, which claims the benefit of and priority to U.S. Provisional Patent Application No. 61/699,704, which was filed on Sep. 11, 2012, both of which are incorporated herein by reference in their entireties.

TECHNICAL FIELD

The present disclosure relates generally to electronic commerce and, more particularly, to software applications for conducting transactions and storing information on mobile computing and cellular devices.

BACKGROUND

Electronic commerce, or "e-commerce" as it is more commonly known, has become one of the most prevalent means for conducting transactions both domestically and internationally. E-commerce can generally be typified as the buying and selling of products or services over electronic systems, such as the Internet and other computer networks. Various forms of electronic payment instruments, such as credit cards, debit cards, pre-paid value cards, cash cards, gift cards, gift certificates, and the like, have been used to facilitate commercial transactions, including web-based (e.g., "e-commerce") transactions and brick-and-mortar (e.g., "store front") transactions. Conventional pre-paid payment mechanisms are typically acquired by a purchaser for value from a seller. The seller can take on various known forms, such as banks and other financial institutions, retailers, online institutions, and other types of entities. The purchaser typically provides value (e.g., currency) to the seller and, in exchange, is issued a pre-paid payment instrument, e.g., by delivering or otherwise associating the value with a pre-paid payment instrument. Traditionally, once the seller completes the initial transaction of selling and providing the pre-paid payment instrument to the purchaser, the seller tracks purchases against currency value attributed to the pre-paid payment instrument.

In a conventional gift card scenario, the originating purchaser is required to travel in person to a brick-and-mortar store and purchase a card that is associated with a certain amount of stored value. Once acquired, the originating purchaser must then mail or otherwise deliver the gift card to the intended recipient, who typically redeems the value of the gift card by traveling to the store, picking out an item for purchase, and presenting the gift card at a point-of-sale terminal as a form of payment. Generally speaking, this scenario is inconvenient for both the originating purchaser and the recipient because of the additional personal time and money required to travel to the store for the original purchase of the gift card as well as subsequent purchases with the gift card. Even for the merchant, this situation may be undesirable due to avoidable overhead costs and personnel time associated with stocking, displaying and selling gift cards. Moreover, gift card redemption is typically limited to a single retailer such that the gift card can be redeemed at that retailer's stores only.

With the advent of the internet and the World Wide Web, internet-based "online" systems enable shoppers to purchase items, such as gift cards or prepaid cards, from home using personal credit cards and a personal computer. In a typical online gift card purchase, the purchaser is required to access a specific website for a desired online retailer, navigate the website to determine where gift cards are available for purchase, choose a gift card and associated value, enter personal shipping and billing information, and, once the transaction is complete, then wait for the gift card to be delivered. The processes and interfaces for purchasing gift cards from an online retailer can oftentimes be confusing and time consuming to the purchaser. Moreover, the originating purchaser or the intended recipient must wait until the gift card is physically shipped and received before they can redeem the value of the card. There are also security risks associated with conducting electronic transactions over the internet. These issues are exacerbated by purchases made electronically with portable computing and cellular devices, such as laptop computers and smartphones, which are more susceptible to loss, theft and tampering than desktop computers.

Various mechanisms have been proposed to provide security and convenience for transactions conducted electronically, especially with respect to individual consumers using mobile computing and cellular devices to purchase goods and services over the Internet from online retailers. For example, a digital wallet (also known as an electronic wallet or "e-wallet") is a software component, typically consisting of various sub-component software components, modules, and the like, that allows a consumer to make a secure electronic payment with an electronic payment instrument, such as a credit card or debit card, during an e-commerce transaction. The software includes features that provide security and encryption for personal information used to conduct the electronic transaction, such as credit card information, bank account information, and other sensitive information. The digital wallet can thus hold a consumer's payment information, a digital certificate to identify the consumer, shipping/address information, and the like to speed transaction processing. Consumers benefit from using a digital wallet because their information is encrypted against piracy, and the digital wallet can automatically input shipping and other necessary information to complete the transaction.

Most digital wallets are stored "client side" on the consumer's personal computer (PC) or smartphone, and are self-maintained. Digital wallets may also reside on a remote, non-consumer owned and operated server, such as a retailer server, a financial institution server, or a digital wallet company server. A "server side" digital wallet, also known as a "thin wallet," is one that an organization creates for and about an individual consumer. Server-side digital wallets are gaining popularity among major retailers due to the security, efficiency, and added utility it provides to the end-user, which increases customer loyalty and purchase frequency. Nevertheless, digital wallets are typically limited in their overall functionality and in the types of information that can be stored in a digital wallet. What is needed are digital storage and security applications for mobile computing and cellular devices that offer the security and benefits of server-side digital wallets, but can be maintained client side on, accessed through and modified with a consumer's portable computing or cellular device. There is also a need for digital storage and security applications that offer more functionality beyond just storing and encrypting personal shipping and bank account information.

SUMMARY

Aspects of the present disclosure are directed to a method of storing on a portable electronic device an electronic gift card issued by a prepaid instrument provider. The method includes: receiving, at a server of the prepaid instrument provider, a request from a web browser running on a portable electronic device for a web page hosted by the prepaid instrument provider server, the request including a uniform resource locator (URL) associated with a selected electronic gift card selected from a plurality of electronic gift cards stored on the prepaid instrument provider server, the selected electronic gift card being associated with a unique identification code, a balance of an amount of value remaining on the selected electronic gift card, a name of a sender of the selected electronic gift card, and a URL link to the selected electronic gift card stored on the prepaid instrument provider server; the prepaid instrument provider server sending to the web browser running on the portable electronic device the web page that includes a user interface control that is configured, when selected, to cause a representation of the selected electronic gift card to be added to an electronic passbook on the portable electronic device; responsive to the prepaid instrument provider server receiving an indication of a selection of the user interface control, receiving from the web browser the unique identification code associated with the selected electronic gift card; responsive to receiving the unique identification code, the prepaid instrument provider server creating an electronic passbook file that includes the balance, the name of the sender, and the URL associated with the selected electronic gift card; and, the prepaid instrument provider server communicating to the web browser the electronic passbook file as the representation of the selected electronic gift card for adding the representation of the selected electronic gift card to the electronic passbook on the portable electronic device.

According to other aspects of the present disclosure, a method is presented for importing to a portable electronic device an electronic gift card issued by a prepaid instrument provider. The method includes: receiving an indication confirming a purchase of an electronic gift card selected from a plurality of electronic gift cards stored on a server of the prepaid instrument provider; in response to receiving the indication confirming the purchase, the prepaid instrument provider associating with the selected electronic gift card at least a unique identification code, an amount of value of the selected electronic gift card, and a uniform resource locator (URL) link to the selected electronic gift card stored on the prepaid instrument provider server; transmitting an electronic notification of the purchase to an intended recipient; receiving from the intended recipient, at the prepaid instrument provider server, a request with the URL link associated with the selected electronic gift card; the prepaid instrument provider server sending to a web browser running on a portable electronic device of the recipient a web page with a user-selectable feature that is operable, when selected, to automatically export a representation of the selected electronic gift card into an electronic passbook on the portable electronic device; responsive to the prepaid instrument provider server receiving an indication of a selection of the user-selectable feature, determining the unique identification code of the selected electronic gift card; from the unique identification code, creating an electronic passbook file that includes the amount of value and the URL link of the selected electronic gift card; and, the prepaid instrument provider server communicating to the portable electronic device the electronic passbook file as the representation of the selected electronic gift card and an instruction to automatically import the representation of the selected electronic gift card into the electronic passbook on the portable electronic device.

In accordance with other aspects of the present disclosure, a method is presented for dynamically constructing a web page for display on a video display of an electronic device. The method includes: determining, from an HTTP header associated with a web page requested from a web browser running on the electronic device, whether an electronic passbook is present on the electronic device, wherein the web page is hosted by a prepaid instrument provider server that issues and stores a plurality of electronic gift cards, and wherein the electronic passbook is configured to store a plurality of virtual instruments; responsive to determining that the electronic passbook is present on the electronic device, adding, prior to displaying the entire web page, a user interface control that is configured when selected to cause a selected electronic gift card of the plurality of electronic gift cards issued by the prepaid instrument provider server to be added to the electronic passbook; and responsive to determining that the electronic passbook is not present on the electronic device, causing the web page to be displayed on the video display without the user interface control Additional aspects of the present disclosure are directed to computer program products comprising one or more non-transient computer-readable media. The computer-readable media includes instructions which, when executed by one or more processors of a prepaid instrument provider, cause the one or more processors to operate with one or more servers of the prepaid instrument provider to perform any of the methods disclosed herein. Systems and devices for storing on a portable electronic device an electronic gift card issued by a prepaid instrument provider are also disclosed.

The above summary is not intended to represent each embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of the exemplary embodiments and modes for carrying out the present invention when taken in connection with the accompanying drawings and appended claims.

Figure 1:
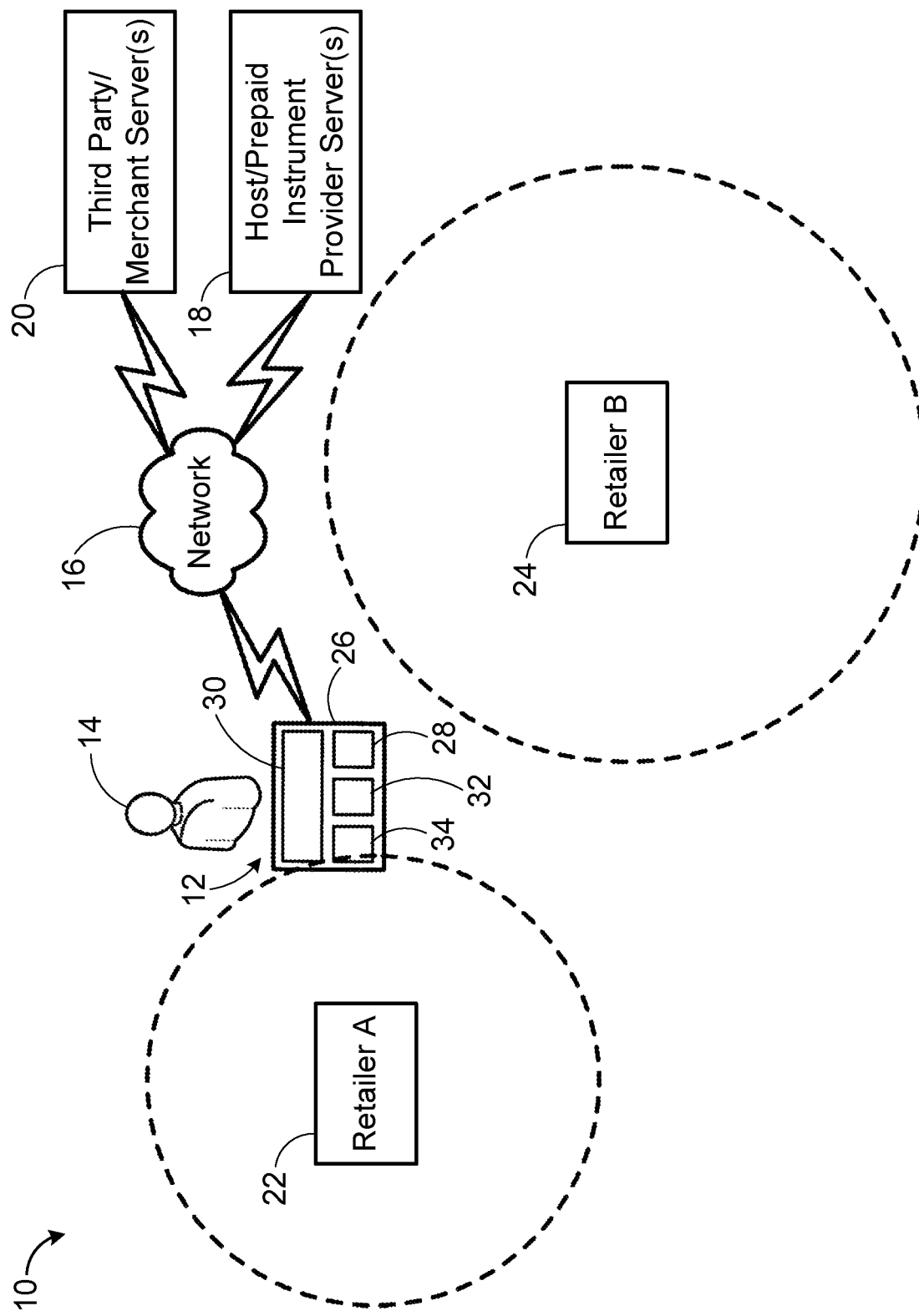
FIG. 1 is a diagrammatic illustration of a representative system for conducting a transaction using a portable electronic device in accordance with aspects of the present disclosure.

While the present disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the scope of the invention as defined by the appended claims.

DETAILED DESCRIPTION OF THE ILLUSTRATED EMBODIMENTS

The present invention is susceptible of embodiment in many different forms and aspects. There are shown in the drawings and will herein be described in detail aspects of the present disclosure with the understanding that it is to be considered as an exemplification of the principles of the invention or inventions disclosed herein and is not intended to limit the broad aspects illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed, the singular includes the plural and vice versa; the words "and" and "or" shall be both conjunctive and disjunctive; the word "all" means "any and all"; the word "any" means "any and all"; and the word "including" means "including without limitation." Moreover, words of approximation, such as "about," "almost," "substantially," "approximately," and the like, can be used herein in the sense of "at, near, or nearly at," or "within 3-5% of," or any logical combination thereof, for example.

Referring now to the drawings, wherein like reference numerals refer to like components throughout the several views, FIG. 1 illustrates an exemplary wireless communications system and network, designated generally as 10, for conducting transactions using a portable electronic device 12 in accordance with aspects of the present disclosure. The system 10 includes, but is not limited to, the portable electronic device 12, which is operated by a user or client 14, a communications network 16, and one or more servers 18 and 20, and one or more participating retailers or merchants 22 and 24. It should be readily understood that the system 10 illustrated in FIG. 1 is merely provided as an exemplary application by which the various inventive aspects and features of this disclosure can be applied. Moreover, only selected components of the system 10 have been shown and will be described in additional detail hereinbelow. Nevertheless, the systems and devices discussed herein can include numerous additional and alternative features, and other well-known peripheral components, for example, for carrying out the various methods and functions disclosed herein. Those components which are not necessary for carrying out the aspects of the present disclosure will not be described in further detail.

The communications network 16 can be a wired or a wireless network, or a combination of wired and wireless technology. In at least some aspects, most if not all of the transaction functions (e.g., purchasing) described herein by the portable electronic device 12 can be conducted over a wireless network, such as a WLAN or cellular data network, to ensure freedom of movement of the user and device 12. In some implementations, the system 10 can be a web-based system where users or clients 14 use internet-based websites and/or web-based applications to access the transaction features disclosed herein. In various aspects, the portable electronic device 12 includes a web browser or a dedicated, standalone application software, or a combination of both. A web browser typically allows the user 14 to search for and/or request a web page (e.g., from the server 18) with a web page request. A web page, in a non-limiting example, is a data file that includes computer executable or interpretable data, graphics, text, video, and/or sound, that can be executed, displayed, played, processed, streamed, and/or stored, and that can contain links to other web pages. In some embodiments, a user manually requests a web page from the server 18. Alternatively, the dedicated transaction software automatically makes requests with the web browser. Examples of commercially available web browser software include, but are certainly not limited to, FIREFOX, available from the Mozilla Corp., of Mountain View, Calif., SAFARI available from Apple, Inc., ANDROID BROWSER, available from Google Inc., and INTERNET EXPLORER, available from Microsoft Corp., of Redmond, Wash. In one implementation, the portable electronic device 12 can connect to the network 16 over a cable, which can pertain to a peripheral bus such as a USB or Firewire® (IEEE-1394) connection.

The communications network 16 connects the user 14, through operation of the portable electronic device 12, with one or more servers 18 and 20. Communication can take place through any now-known or hereinafter developed media, such as telephone lines (e.g., Dial-Up), local area network (LAN) or wide area network (WAN) links (e.g., Ethernet, T(X) lines, X.25, etc.), broadband connections (e.g., Integrated Service Data Network (ISDN), Frame Relay, etc.), wireless links (e.g., infrared, Bluetooth®, WiFi or WLAN), cellular networks, and so on. The network 16, in at least some embodiments, can typically carry Transmission Control Protocol/Internet Protocol (TCP/IP) protocol communications, and HTTP/HTTPS requests made by a web browser and associated responses and replies, and the connection between client software and a server can be communicated over such TCP/IP networks. Some non-limiting examples of networks that can serve as the communications network 16 include a wireless or wired Ethernet-based intranet, a local or wide-area network (LAN or WAN), and/or the global communications network known as the Internet, which can be configured to accommodate many different communications media and protocols.

The dedicated transaction or application software can be implemented in various forms. For instance, the dedicated transaction software or application software can be in the form of a web-based (e.g., Java) applet that is downloaded to the portable electronic device 12 and runs in conjunction with a web browser on the portable electronic device 12. Optionally, the dedicated transaction software can be in the form of a standalone software application, which can be implemented in a multi-platform language such as .Net or Java, or in native processor executable code. If executed on the portable electronic device 12, the dedicated transaction software can be operable to open a network connection with the servers 18, 20 over the communications network 16 and, thus, communicates via that connection with the server servers 18, 20. In some embodiments, the dedicated transaction software of the portable electronic device 12 communicates with a single "host" or "client" server 18, which in turn conducts any necessary communications with one or more "third party" servers 20 to complete a particular transaction. Optionally, the dedicated transaction software and web browser can be part of a single client-server interface, where the software can be implemented as a "plug-in" to the web browser, for example. Other optional variations and known alternatives are considered to be within the scope and spirit of the present disclosure. The host server 18 can include one or more servers, such as a host server and a prepaid instrument provider server, such as a server operated by First Data Corporation's merchant processing service. In some implementations, the host server 18 can carry out the functions of a prepaid instrument provider server, or the host server 18 can interface with a remote prepaid instrument provider server, which manages and stores gift cards and their associated account information including balances. An example of a host server is a digital gifting platform operated by CashStar, Inc., the assignee of the present disclosure. The third party servers 20 can include more than one third party server (e.g., a third party relative to the prepaid instrument provider), including, for example, servers of several independently owned and operated merchants, which are not owned or operated by the host/prepaid instrument provider server 18. In other words, the entity operating the server 20 is not the same entity as the issuer of the prepaid instruments stored on the prepaid instrument provider server 18. The reference numbers 18 and 20 each generally designates one or more servers.

In the illustrated system, the network 16 is used to securely communicatively couple the portable electronic device 12 to one or more of the servers 18, 20. Each server 18, 20 can be implemented on one or more server class computers, which can be subcomponents of a computer hardware server system, with sufficient memory, data storage, and processing power and, in some embodiments, the capabilities to run a server class operating system (e.g., GNU/Linux, SUN Solaris, Microsoft Windows OS, etc.). The servers 18, 20 can each be part of a logical group of one or more servers, such as a server farm or server network. As is typical in large-scale systems, the application software can be implemented in components, with different components running on different server computers, on the same server, or any logical combination thereof. Although FIG. 1 illustrates a single portable electronic device 12 communicating with a single host server 18 over a single network 16 to execute a transaction with a single retailer 22, it should be understood that the system 10 can support numerous portable electronic devices 12 operating over one or more networks 16 to conduct transactions with an array of retailers 22 through a variety of host servers 18 and third party servers 20.

The portable electronic device 12 comprises a housing or casing 26 and includes one or more input devices 28, which can include various devices such as a keyboard, buttons on a button panel, a single- or multi-touch screen, a track ball, a track pad, a microphone, or voice and/or gesture recognition software and hardware. For output, the portable electronic device 12 can include, in a few examples, a display device 30, which can include a high-resolution liquid crystal display (LCD) panel, a plasma display, or a light emitting diode (LED) or organic LED (OLED) display, one or more speakers, one or more user-accessible ports (e.g., an audio output jack for headphones, a video headset jack, etc.), and other conventional I/O devices and ports. The primary display device 30 can be configured to display aspects of the dedicated transaction software, which can take on the form of a dedicated mobile software application (or "app"), as well as other tangential features, functions and information, such as text messaging, emails, alerts and announcements, personal information, advertisements, and the operating status of the portable electronic device 12. In some embodiments, the portable electronic device 12 can also include a location tracking device 34, which can include a global positioning system (GPS) receiver. Examples of some portable electronic devices include, but are not limited to, cellular phones and smartphones, laptop computers, tablet computers (e.g., the Samsung GALAXY TAB tablet device and the Apple IPAD tablet device), e-readers (e.g., the KINDLE electronic reader device), personal digital assistants (PDA), etc. By portable, it is meant that the device can be comfortably held in the hand or hands of one adult human and weighs less than a pound to a few pounds.

In some embodiments, the user-input device(s) 28 accept(s) user input(s) and transforms the user input(s) to electronic data signals indicative of input or inputs, which can correspond to an enabled feature for such input(s) at a time of activation. The input(s), once transformed into electronic data signals, can be outputted to a central processing unit (CPU) or controller 32 for processing. The electronic data signals can correspond to an electrical current, an electrical voltage, an electrical charge, an optical signal, or a magnetic signal, or any combination thereof.

To enhance security, a transaction with the portable electronic device 12 can be optionally enabled only by an authentication process in which a primary or secondary source confirms the identity of the user 14. Upon entry of user identification information, for example, such as a password, PIN number, credit card number, personal information, biometric input, predefined key sequences, etc., the user can be permitted to access a user account. Thus, a transaction can be enabled by, for example, a combination of personal identification input (e.g., mother's maiden name) with a secret PIN number, or a combination of a password and a corresponding PIN number, or a combination of a credit card input with secret PIN number. Other conventional security or authentication features can be utilized to prevent unauthorized access to a user's account, for example, to minimize an impact of any unauthorized access to a user's account, or to prevent unauthorized access to any personal information or funds accessible via a user's account.

The various components of the portable electronic device 12 are controlled by one or more processors (e.g., CPU, distributed processors, etc.) 32, also referred to herein generally as a controller (e.g., microcontroller, microprocessor, etc.). The controller 32 can include any suitable processor(s). By way of example, the controller 32 can include a plurality of microprocessors including a master processor, a slave processor, and a secondary or parallel processor. Controller 32, as used herein, can comprise any combination of hardware, software, and/or firmware disposed inside and/or outside of the housing 26 of the device 12 that is configured to communicate with and/or control the transfer of data between the portable electronic device 12 and a bus, another computer, processor, or device and/or a service and/or a network. The controller 32 is generally operable to execute any or all of the various computer program products, software, applications, algorithms, methods and/or other processes disclosed herein. The controller 32 can include a memory device or can be coupled to a memory device, which can comprise a volatile memory (e.g., a random-access memory (RAM) or multiple RAM) and a non-volatile memory (e.g., an EEPROM).

Location and movement of the portable electronic device 12 can be tracked via a location tracking device 34, which can reside in the portable electronic device 12. As indicated above, the location can be determined through a satellite-based GPS navigation system. Even without a GPS receiver, the portable electronic device 12 can provide location and movement information through cooperation with a cellular system through a process known as "trilateration." A cellular system's towers and base stations communicate radio signals and are arranged into a network of cells. Cellular devices, such as cellphones, smartphones and cellular-enabled tablet computers, have low-power transmitters for communicating with the nearest tower, base station, router, or access point. As a user moves with the cellular device, e.g., from one cell to another, the base stations monitor the strength of the transmitter's signal. When the cellular device moves toward the edge of one cell, the transmitter signal strength diminishes for a current tower. At the same time, the base station in the approaching cell detects a strength increase in the signal. As the user moves into a new cell, the towers transfer the signal from one to the next. A computer can determine the location of the device based on measurements of the transmitter signal, such as the angle of approach to the cell tower(s), the time it takes the signal to travel to multiple towers, and the strength of the signal when it reaches the towers. According to other aspects of at least some embodiments of the present concepts, a movement sensor can be provided comprising one or more sensors configured to determine the movement (e.g., rotation, translation, etc.) of the portable electronic device 12 with respect to an established datum or reference (e.g., position, spatial orientation, reaction, force, velocity, acceleration, electrical contact, etc.) about or along one or more axes.

Figure 2A:
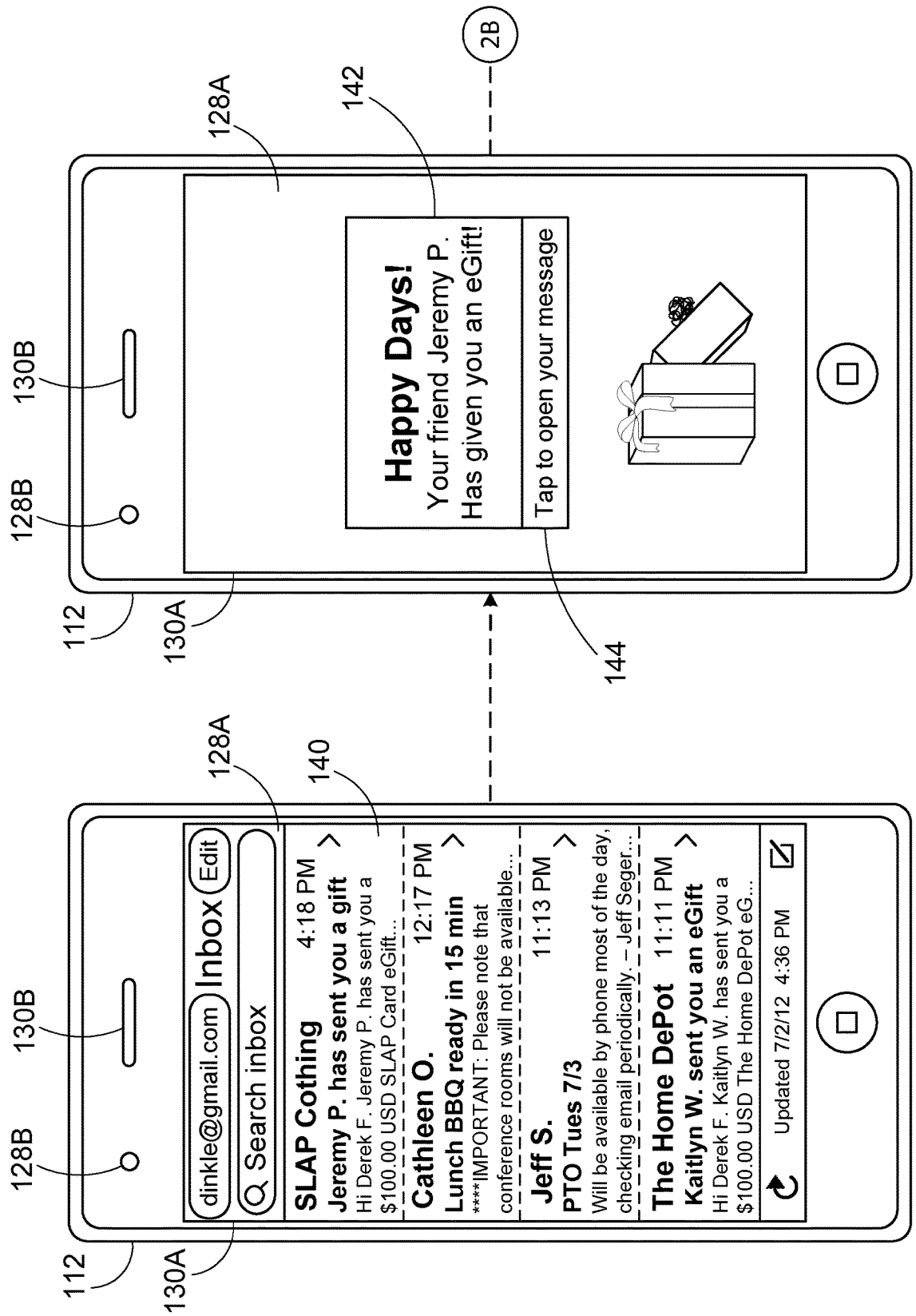
FIGS. 2A-2C are plan-view illustrations of an exemplary portable electronic device with an electronic passbook with which aspects of the present disclosure can be practiced.
Figure 2B:
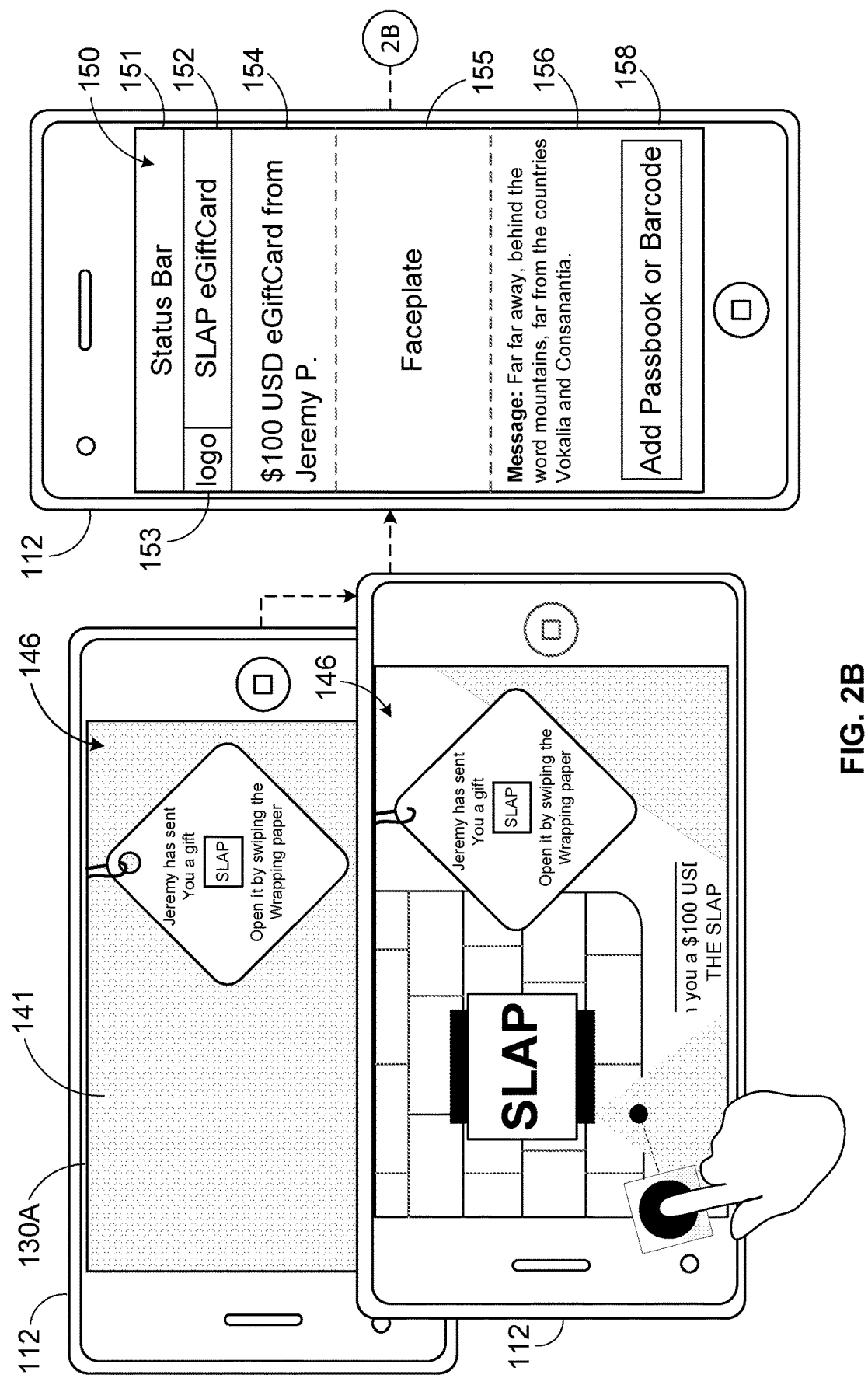
Figure 2C:
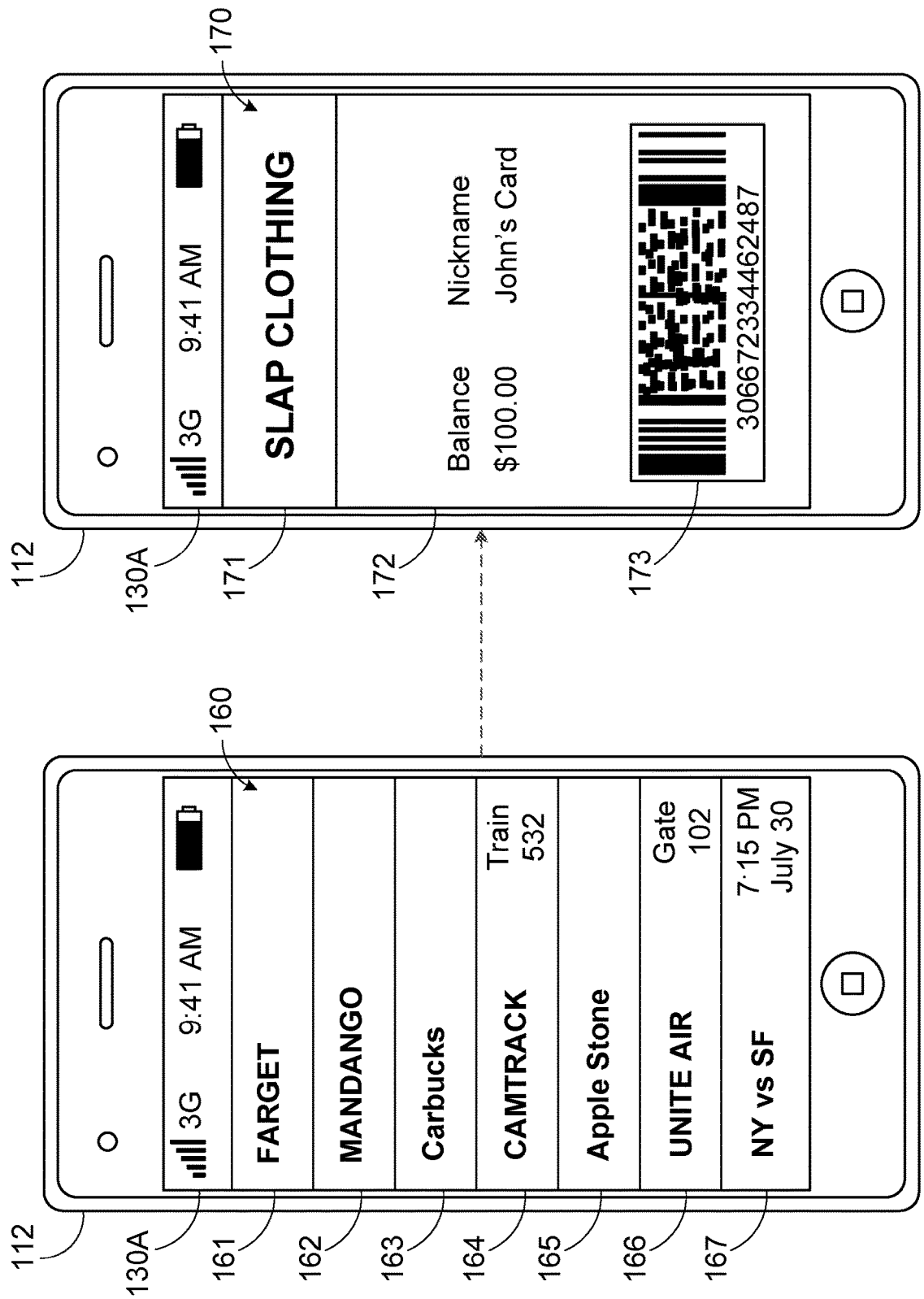

FIGS. 2A-2C provide a more specific example of a portable electronic device, which is illustrated as a WiFi-enabled and cellular-enabled smartphone 112. The smartphone of FIGS. 2A-2C includes various known input and output devices, including one or more input devices, which in this example includes a touch screen (or "touchscreen") 128A and a digital camera 128B, and one or more output devices, such as a high-resolution LCD display screen 130A and an ear speaker 130B. The portable electronic device 112 of FIG. 2 can take on any of the various forms, optional configurations, and functional alternatives, including those described above with respect to the aspects exemplified in the portable electronic device 12 of FIG. 1, and thus can include any of the corresponding options, components and features. For instance, the portable electronic device 112 can communicate with one or more servers (e.g., servers 18 and 20 of FIG. 1) via a wireless network (e.g., network 16 of FIG. 1) in any of the manners described above or otherwise known.

Downloaded to or otherwise available on the portable electronic device 112, e.g., as a standard feature with the device's operating system, is a software application for conducting transactions electronically. This software application is portrayed as a dedicated mobile software application 160 (more commonly known as a "mobile application" or just "app"). The software application 160 (FIG. 2C) can take on any of the various forms and optional alternatives described above as well as those now known and hereinafter developed. As will be developed in further detail below, the software application 160 is an electronic passbook. The electronic passbook is operable, in at least some embodiments of the present disclosure, to store electronic travel tickets, electronic entertainment event tickets, electronic pre-paid value cards, electronic loyalty cards, or electronic coupons, or any combination thereof. For example, the electronic passbook can safely store airplane boarding passes, sporting, concert and movie tickets, retail coupons, loyalty cards, virtual gift cards, and more all in one place. Rather than merely saving information associated with each of these articles, the electronic passbook allows the user to save, organize, access, and redeem or otherwise use the passes/tickets/coupons/cards/etc. By way of non-limiting example, the electronic passbook allows the user to present the portable electronic device 112 on site and, directly from the display screen 130A or through onboard wireless technology (e.g., near field communication (NFC) technology or radio-frequency identification (RFID) technology) redeem a retail coupon, check in at an airline gate for a flight, or access a movie at the movie theatre. The electronic passbook may offer additional functionality, including generating notifications (e.g., a "push" notification) indicating when a concert or movie is about to start, when a retail coupon is about to expire, when a flight has been delayed, or when the balance of a pre-paid store card is running low. In contrast to prior art digital wallets (or "e-wallets"), the electronic passbook may be characterized, at least in part, by not being operable to store bank account information, credit card information, or personalized shipping information of the user.

As seen in FIG. 2A (left), the user (a fictitious "Derek F.") of the portable electronic device 112 has received an electronic notification, in the form of an email 140, indicating that another person (a fictitious "Jeremy P.") has sent to the user an electronic gift card (eGC). In this example, a prepaid instrument provider may receive an electronic confirmation that Jeremy P. purchased an eGC, which was selected from an assortment of available electronic gift cards that are stored on one or more servers of the prepaid instrument provider (e.g., host server 18 of FIG. 1). The confirmation can include various types of information, including proof of purchase, a specific merchant for the eGC (e.g., SLAP Clothing), a selected design for the eGC, and a card value of the eGC, which can be a fixed value, a value chosen from one or more predefined values, or a user-defined value. The electronic confirmation may also include other information, such as the intended recipient's personal information and/or an email address, a mailing address, or a preexisting account number for purposes of delivery. Some other optional information may include the purchaser's/sender's personal contact information, a date of purchase, associated terms and conditions, etc. It is also within the scope and spirit of the present disclosure that the purchaser/sender buy the eGC for himself/herself; in such an instance, the purchaser (e.g., "Jeremy P.") would be receiving the email 140. As another optional alternative, the electronic notification may have been generated and transmitted from a source other than the prepaid instrument provider (e.g., by the third party servers 20 of FIG. 1).

For some preferred embodiments, the eGC is a "virtual gift card" (generally called a virtual prepaid instrument) where a physical (e.g., plastic or paper) gift card or gift voucher is not issued with the purchase. The term "card" includes a voucher, ticket, coupon, and the like, and is not limited to any particular tangible form such as paper or plastic. "Virtual" as used herein means that the prepaid instrument exists electronically, such as an electronically stored file, that is stored on a non-transitory computer-readable medium, such as a memory device. According to some implementations, a virtual gift card account is created and a redemption code is assigned to that account, such as by the prepaid instrument provider server 18. Redeeming the eGC, in some implementations, merely requires displaying, via the display device 130A, a digital representation of the virtual gift card with the characterizing indicia of the gift card and presenting the digital representation at a point-of-sale retailer. Virtual gift cards offer many of the conveniences of a traditional gift card, but are typically available within seconds or minutes without the extra time and cost associated with shipping a physical gift card, and are less susceptible to loss and theft. Gift recipients can receive an email notification with a link to activate their virtual gift card. In the context of the present disclosure, virtual gift cards offer the benefit of allowing the user to instantly redeem a virtual gift card at a merchant's store or kiosk, or at the webpage of an online retailer, without having to log into any accounts to authenticate the transactions. The user is not required to visit any outside websites or enter any further authentication information, though in some implementations, these actions are contemplated by this disclosure.

In response to the electronic confirmation of the eGC purchase, the prepaid instrument provider will generate a profile for the selected eGC, store the profile locally on the prepaid instrument provider server(s), and associate unique sales information with the selected eGC. The unique sales information can include any or all of the information provided in the electronic confirmation of purchase, which is discussed above. In addition, or alternatively, the unique sales information will include a unique identification code and a uniform resource locator (URL) link to the selected electronic gift card stored on the prepaid instrument provider's server(s). Other types of information can also be associated with the eGC profile—e.g., a date of purchase, a card number (which is distinct from the unique ID code), a point of purchase, billing information for the purchaser, a balance of the amount of value remaining on the selected electronic gift card, etc.

The prepaid instrument provider will then generate and transmit an electronic notification (e.g., email 140 of FIG. 2A) of the purchase to the intended recipient of the selected eCG. When the user accesses or "opens" the electronic notification, they can be presented with a message, a picture, a logo, an animation, a sound byte, or any other indicia, singly or in combination, to notify the user of the purchased eGC. As seen in FIG. 2A (right), for example, upon selection of the email 140, the user is presented with a message 142, which states "Happy Days! Your friend Jeremy P. has given you an eGift!" The email 140 also presents to the user a user-selectable button 144 which, once selected, accesses a specific URL in a web browser (e.g., SAFARI or ANDROID BROWSER) on the portable electronic device 112, and directs the user to a web page hosted by the prepaid instrument provider with a simulated gift-unwrapping feature 146. That is, selection of the user-selectable button 144 may include transmitting a request to the server(s) of the prepaid instrument provider. The request can be transmitted by a web browser running on the portable electronic device 112. The request for the web page hosted by the prepaid instrument provider server may include the URL associated with the selected eGC. The user-selectable button 144 may take on alternative forms, such as a hypertext-file user-selectable hyperlink and/or instructions for opening a web browser and submitting the request manually. Optionally, the user-selectable button 144 may be omitted altogether; in this instance, the transmission of the request can be automated, for example, in response to the recipient opening the email 140.

Upon receiving the request from the web browser running on the portable electronic device 112 for the web page hosted by the prepaid instrument provider server(s), the prepaid instrument provider server(s) sends the requested web page to the web browser, which includes the optional gift-unwrapping feature 146. This optional feature 146, which can best be seen in FIG. 2B (left), displays to the user a simulated gift box 148 wrapped in wrapping paper (left, top). To reveal the eGC, namely the value of the eGC, the retailer associated with the eGC, and the sender of the eGC, the user is prompted to "unwrap" the gift box 148 by swiping their finger or other appendage back and forth across display screen 130. After the gift box is unwrapped, the selected eGC, including the sender (e.g., "Jason"), the merchant (e.g., SLAP Clothing), which operates separately from the prepaid instrument provider, and the value of the eGC (e.g., $100 USD) is revealed to the user, as seen in FIG. 2B (left, bottom).

After completing the gift-unwrapping feature 146, the user is directed to an eGC summary page 150 for providing more detailed information about the eGC transaction. For instance, in the example illustrated in FIG. 2B (right), the summary page 150 provides the user with a "Status Bar" 151, a nameplate 152 with the name of the merchant associated with the eGC (e.g., "SLAP eGiftCard"), branding information unique to that merchant associated with the eGC (e.g., a SLAP logo 153), a value or a remaining balance 154 of the eGC, a faceplate 155 with a design of the eGC, and a message box 156 with a message from the sender. Additional and alternative types of information can be presented to the user in the summary page 150.

The web page in FIG. 2B (right) also includes a user interface control 158 (also referred to herein as "user-selectable control") that is configured, when selected, to cause a representation of the selected eGC to be added to the electronic passbook 160 on the portable electronic device 112. With regard to the illustrated example, the user "selects" the user interface control 158 using any of the input devices available on the portable electronic device 112 (e.g., touchscreen 128A). For some optional implementations, the user interface control 158 can be omitted altogether such that a representation of the selected eGC is automatically imported into the electronic passbook 160 on the portable electronic device 112, for example, upon completion of the simulated gift-unwrapping feature 146 or at another predetermined time.

The one or more servers of the prepaid instrument provider, in response to receiving an indication of a selection of the user interface control 158, will determine the unique identification code of the selected eGC. In some embodiments, this can include receiving from the web browser on the portable electronic device 112 the unique ID code associated with the selected eGC. Optionally, or as an alternative for some embodiments, the unique ID code can be retrieved from another source or any number of available sources, such as directly from the prepaid instrument provider server(s).

Responsive to receiving or otherwise determining the unique ID code for the eGC, the prepaid instrument provider server(s) creates an electronic passbook file 170 (or "e-pass") for the selected eGC. From the unique sales information stored along with the unique ID code in the eGC profile on the host server(s) 18 of FIG. 1, for example, an e-pass file 170 can be generated with any of an assortment of requisite information. The electronic passbook file 170 can be created dynamically after the prepaid instrument provider server(s) receives notification that the user interface control 158 has been selected. The electronic passbook file 170 can be based on a template e-pass file and predefined guidelines provided by the merchant and/or manufacturer of the portable electronic device 112. The electronic passbook file may include any or all of the information in the eGC profile, including the available balance and the name of the sender (displayed at 172 in FIG. 2C), as well as the URL associated with the selected eGC. The electronic passbook file 170 can include other relevant information as well, such as the merchant associated with the selected eGC (displayed at 171 in FIG. 2C), a card number and bar code associated with the selected eGC (displayed at 173 in FIG. 2C) for redemption thereof, and/or a personal identification number (PIN). The card number associated with the selected electronic gift card is typically distinct from the unique identification code. For instance, a distinct card number may be assigned to each eGC by the merchant in advance of purchase to keep track of the total number of available gift cards, while a unique ID code is created and assigned to the eGC by the prepaid instrument provider after the eGC is purchased.

Once the e-pass file is created, the prepaid instrument provider server(s) sends the e-pass file 170 to the intended recipient. In some embodiments, the host server(s) 18 communicates to the web browser on the portable electronic device 112 the electronic passbook file 170 as the representation of the selected eGC, which will subsequently be added to the electronic passbook 160. As seen in FIG. 2C (left), for example, the electronic passbook 160 is shown displaying seven individually selectable e-pass files: a FARGET e-pass 161 for a national discount-retail chain; a MANDANGO e-pass 162 for an online concert ticket retailer; a CAR-BUCKS e-pass 163 for a local carwash chain; a CAMTRACK e-pass 164 for an international passenger-train carrier; an APPLE STONE e-pass 165 for an independently owned and run grocery store; a UNITE AIR e-pass 166 for an international airline company; and a National Baseball League (NBL) e-pass 167 for tickets to see teams of a professional baseball league. A new e-pass file 170 is shown in FIG. 2C (right) being exported from the prepaid instrument provider, through the onboard web browser, and imported by the portable electronic device 112 into the electronic passbook 160. The e-pass file 170, in some embodiments, can be automatically downloaded from the web browser into the electronic passbook 160 on the portable electronic device 112, as described above. The e-pass file 170 may include branding information unique to the merchant (e.g., SLAP Clothing), pre-established terms and conditions for using the selected eGC, and/or a hyperlink to a webpage hosted by the merchant (e.g., to redeem the balance on the eGC. Once received, the e-pass file 170 is automatically added to the electronic passbook 160.

Prior to importing the e-pass file 170, the host server(s) 18 may need to determine whether the portable electronic device 112 supports this platform (i.e., includes an electronic passbook 170) prior to sending the e-pass file 170 for the eGC to the device 112. Determining whether the portable electronic device 112 includes an electronic passbook 170 may be a single-step or a multi-step verification process, including as some non-limiting examples: ascertaining the make and model of the portable electronic device 112; ascertaining if the portable electronic device 112 is JavaScript enabled; ascertaining what type of operating system, and the version of the operating system, that is on the portable electronic device 112; and/or ascertaining the type and version of the web browser running on the portable electronic device 112. Fewer, greater or alternative steps than those enumerated above are certainly contemplated as being within the scope of spirit of the present disclosure.

Figure 3:
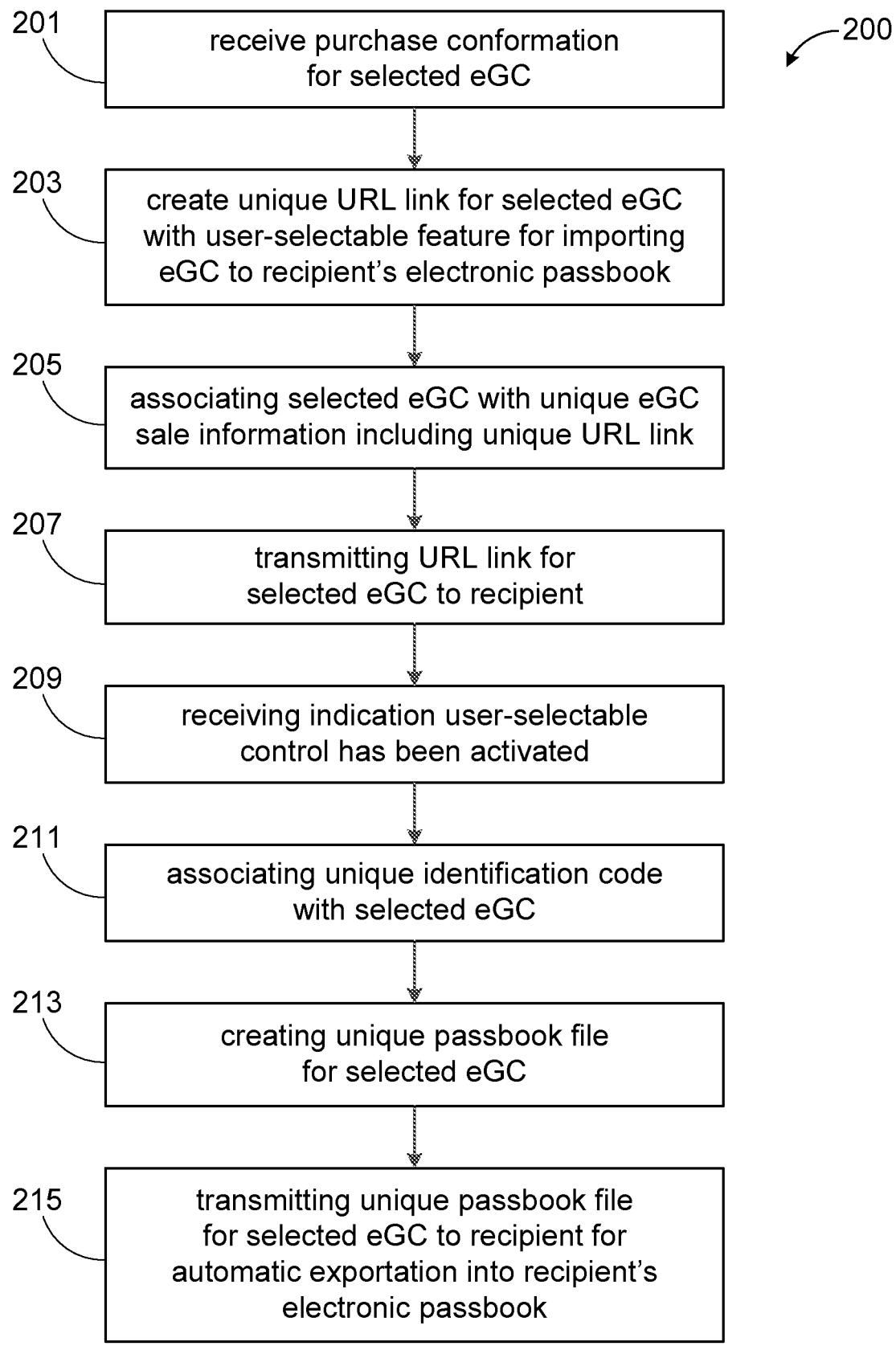
FIG. 3 is a flow chart representing an exemplary algorithm or method for storing an electronic gift card in an electronic passbook on a portable electronic device in accordance with aspects of the present disclosure.

With reference now to the flow chart of FIG. 3, an improved method for storing on a portable electronic device an electronic gift card issued by a prepaid instrument provider is generally described as an algorithm 200 in accordance with aspects of the present disclosure. FIG. 3 can be representative of an algorithm 200 that corresponds to at least some instructions that can be stored, for example, in a memory device, and executed, for example, by a CPU to perform any or all of the above and/or below described functions associated with the disclosed concepts. The method 200 will be described with reference to the various aspects and features shown in the other Figures of the drawings; such reference is being provided purely by way of explanation and clarification.

The method 200 starts at block 201 with receipt (e.g., via server 18 of FIG. 1) of a purchase confirmation for a selected electronic gift card (eGC). Then, at block 203, the method 200 includes creating a unique URL for the selected eGC, which includes a user-selectable control or other feature for importing the selected eGC to the recipient's electronic passbook. In block 205, the selected eGC is associated with unique eGC sales information. This information may include, in any combination, a unique identification code, a balance of an amount of value remaining on the selected electronic gift card, a name of a sender of the selected electronic gift card, and a URL link to the selected electronic gift card stored on the prepaid instrument provider server. Like block 201, the steps presented in blocks 203 and/or 205 may be performed by the server(s) 18 of the prepaid instrument provider. An electronic notification of the purchase can be contemporaneously transmitted to the intended recipient(s).

At block 207, the URL link to the selected eGC is sent to the intended recipient(s). Black 207 may be performed in response to receipt from an intended recipient, at the prepaid instrument provider server, of a request with the URL link associated with the selected electronic gift card. Block 207 may include the prepaid instrument provider server sending to a web browser running on a portable electronic device of the recipient a web page with a user-selectable control that is operable, when selected, to automatically export a representation of the selected electronic gift card into an electronic passbook on the portable electronic device.

The method 200 continues, at block 209, which receipt of an indication that the user-selectable control has been activated or otherwise selected. At block 211 a unique ID code associated with the selected eGC is determined. The unique ID code may have been generated and associated with the selected eGC contemporaneous with blocks 203 and/or 205. The unique ID code may be received from the web browser running on the recipient's portable electronic device. Responsive to determining the unique ID code at block 211, an electronic passbook file is created, for example, by the prepaid instrument provider server(s) at block 213. The electronic passbook file may include the balance, the name of the sender, and the URL associated with the selected electronic gift card. At block 215, the unique electronic passbook file is transmitted to the recipient for automatic exportation into the recipient's electronic passbook.

In some embodiments, the method 200 includes at least those steps enumerated above. It is also within the scope and spirit of the present invention to omit steps, include additional steps, and/or modify the order presented above.

Figure 4:
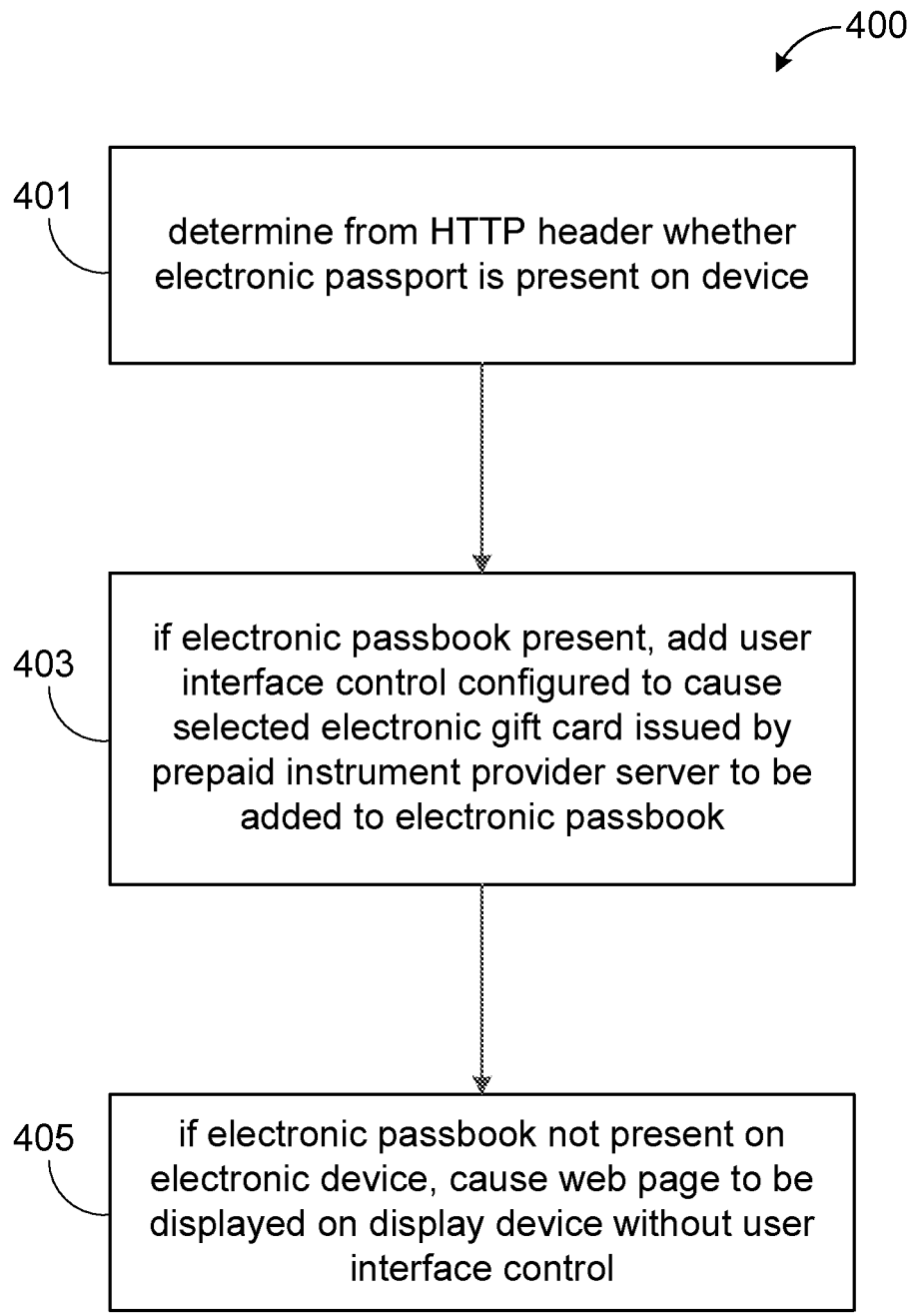
FIG. 4 is a flowchart illustration of an example method or algorithm of a prepaid instrument provider dynamically building a web page depending on the capabilities of the portable electronic device.

FIG. 4 is a flowchart illustration of an example method or algorithm 400 of a prepaid instrument provider dynamically building a web page depending on the capabilities of the portable electronic device. The algorithm 400 determines from an HTTP header whether an electronic passbook is present on the electronic device 12 (401). If an electronic passbook is present, the prepaid instrument provider server 18 adds to the web page a user interface control, which is configured to cause a selected electronic gift card issued by the prepaid instrument provider server 18 to be added to the electronic passbook (403). However, if the electronic passbook is not present on or supported by the electronic device 12, the prepaid instrument provider server 18 causes a web page to be displayed on the display device 30 of the electronic device 12 without the user interface control.

In some embodiments, the method 400 includes at least those steps enumerated above. It is also within the scope and spirit of the present invention to omit steps, include additional steps, and/or modify the order presented above.

Figure 5:
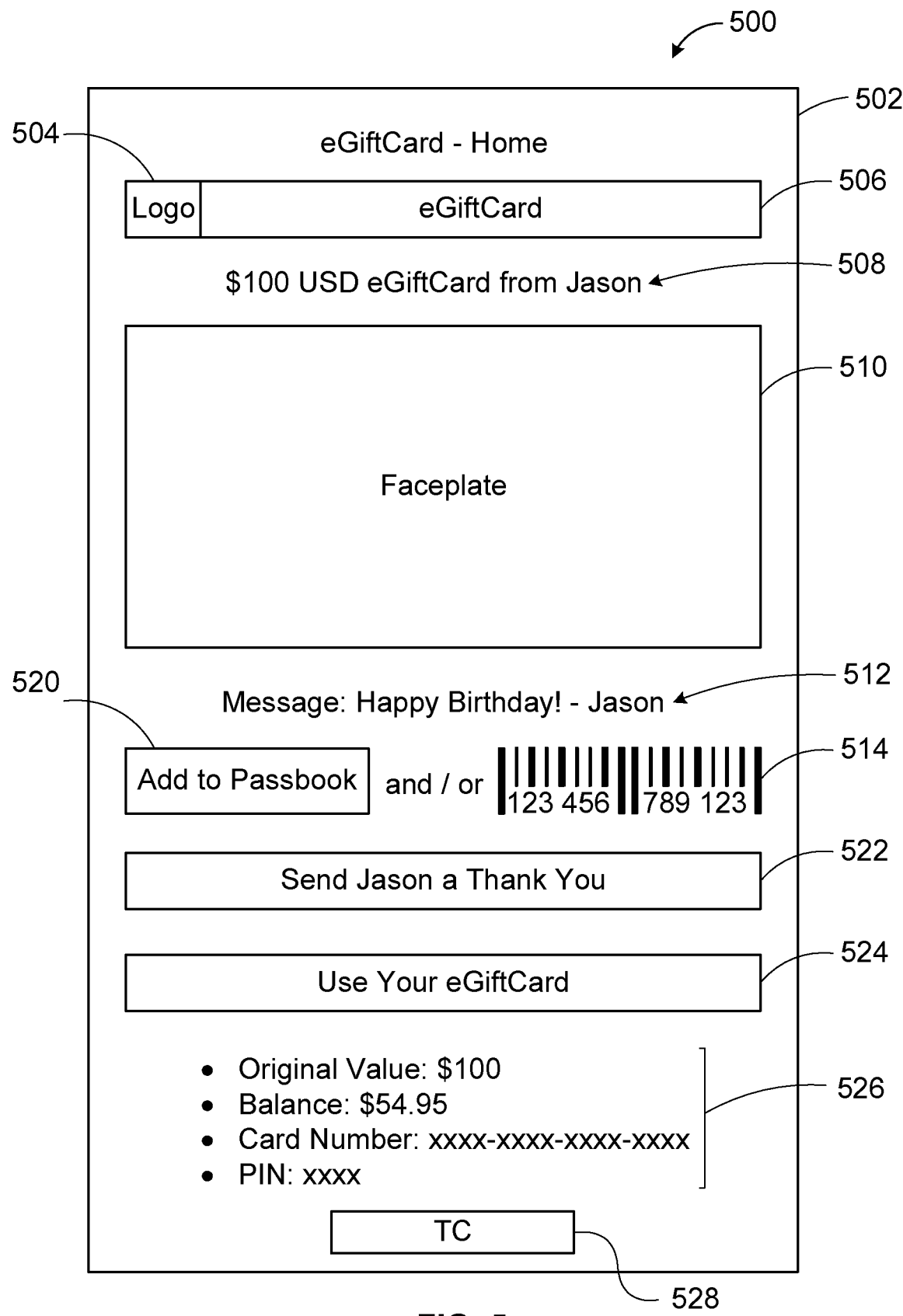
FIG. 5 is an example web page hosted and generated by the prepaid instrument provider server displaying a button control, which indicates that the electronic device supports an electronic passbook.

FIG. 5 is an example graphical user interface 500 displayed on the display device 30 of the portable electronic device 12. The graphical user interface 500 includes a web page 502 hosted by the prepaid instrument provider server 18. The prepaid instrument provider server 18, via one or more controllers, implements a method of dynamically constructing one or more web pages, including the web page 502, for display on the display device 30 of an electronic device, such as the portable electronic device 12.

The prepaid instrument provider server 18 determines, from an HTTP header associated with the web page 502 requested from a web browser running on the electronic device 12, whether an electronic passbook is present on the electronic device 12. The web page 502 is hosted by the prepaid instrument provider server 502, which issues and stores multiple electronic gift cards. The electronic passbook includes an electronic passbook module and is configured to store multiple virtual instruments. Examples of virtual instruments that can be stored in the electronic passbook include boarding passes, movie tickets, retail coupons, loyalty cards, and electronic gift cards. An example of an electronic passbook is the PASSBOOK available from Apple, Inc. for iOS 6.0 or later. A virtual instrument is used to interact with the physical world at a point-of-sale (POS) terminal or under verification by a human. A virtual instrument can include an electronic code (such as a barcode or a quick response QR code) that is sensed (such as by a near-field communication NFC sensor) or scanned (such as by an imaging camera or barcode scanner) by a sensor to convert the electronic code to corresponding digital information indicative of the electronic code.

If the prepaid instrument provider server 18 determines that the electronic passbook is present on the electronic device 12, the prepaid instrument provider server 18 adds, prior to displaying the entire web page 502, a user interface control 520 that is configured when selected to cause a selected electronic gift card 506 of the electronic gift cards issued by the prepaid instrument provider server 18 to be added to the electronic passbook. The prepaid instrument provider server 18 dynamically constructs the web page 502 based on the capability of the electronic device 12 (explained in more detail below) before the entire web page 502 is displayed on the display device 30.

If the prepaid instrument provider server 18 determines that the electronic passbook is not present on the electronic device, the prepaid instrument provider server 18 causes the web page 502 to be displayed on the display device 30 without the user interface control 520. For example, as shown in FIG. 5, instead of displaying the user interface control 520 in the form of a button control bearing the indicia "Add to Passbook," the prepaid instrument provider server 18 causes a barcode 514 associated with a card number 526 of the selected electronic gift card to be displayed on the display device 30 of the portable electronic device 12.

As mentioned above, whether the user interface control 520 is added to the web page 502 depends on whether the electronic device 12 supports electronic passbooks. This determination can include determining a version of an operating system (OS) running on the electronic device 12 and a type of the web browser running on the electronic device 12. The prepaid instrument provider server compares the determined version and the determined type with a predetermined version and a predetermined type that are known to support the electronic passbook. For example, the predetermined operating system version can be IOS 6.0 or higher, and the predetermined type of the web browser can be SAFARI provided by Apple, Inc. If the device 12 lacks either IOS 6.0 or higher or the SAFARI web browser, the prepaid instrument provider server 18 determines that the device 12 does not support electronic passbooks and will therefore omit the user interface control 520 from the web page 502. The OS version and the browser type can be extracted from the user-agent field of the HTTP header of the requesting device 12.

Optionally, in addition to the OS version and the browser type, the prepaid instrument provider server 18 can also determine a device type of the electronic device 12 and compare the determined device type with a predetermined device type known to support the electronic passbook. For example, a predetermined device type can include the IPHONE smartphone by Apple, Inc., and if the determined device type corresponds to the IPHONE smartphone, and the OS version and the browser type match the corresponding predetermined OS version and browser type, the prepaid instrument provider server 18 adds the user interface control 520 to the web page 502 dynamically as the web page is being constructed in response to receiving a GET request before delivering the entire web page for display on the display device 30 of the electronic device 12. Like the OS version and the browser type, the prepaid instrument provider server 18 can extract the device type from the user-agent field of the HTTP header.

As shown in FIG. 5, the user interface control 520 is a button bearing indicia (in this example, "Add to Passbook") indicating that if the button 520 is selected, the selected electronic gift card will be added to the electronic passbook. The electronic device 12 handles adding the electronic gift card to the electronic passbook, as explained in more detail below.

As discussed above, the prepaid instrument provider server 18 is remote from the electronic device 12, and the prepaid instrument provider server 18, not the electronic device 12, determines whether the electronic passbook is present. The prepaid instrument provider server 18 dynamically builds or constructs the web page 502 as a function of whether the electronic passbook is present such that different content is presented on the web page 520 depending on whether the electronic device 12 includes the electronic passbook. For example, in FIG. 5, if the device 12 supports an electronic passbook (e.g., the electronic passbook functionality is enabled or available on the device 12), the user interface control 520 is displayed on the web page 520. The barcode 514 can optionally also be displayed on the web page 502. However, if the device 12 does not support an electronic passbook (e.g., the electronic passbook functionality is disabled, unavailable, or not present on the device 12), the barcode 514 is displayed on the web page 502 instead of the user interface control 520.

The prepaid instrument provider server 18 can determine whether the electronic passbook is present based on additional information. For example, the prepaid instrument provider server 18 can receive an indication of a selection of the user interface control 520 and, responsive thereto, receive from the web browser a unique identification code associated with the selected electronic gift card. In response to receiving the identification code, the prepaid instrument provider server 18 creates an electronic passbook file that includes at least the monetary balance, the name of the sender, and the URL link of the selected electronic gift card. Once the prepaid instrument provider 18 creates or builds the electronic passbook file, the prepaid instrument provider server 18 communicates to the web browser the electronic passbook file as the representation of the selected electronic gift card for adding the representation of the selected electronic gift card to the electronic passbook that stores a plurality of instruments of value.

Optionally, prior to adding the selected electronic gift card to the electronic passbook, the prepaid instrument provider server 18 can present a challenge page, such as a challenge web page, on the electronic device 12. The challenge web page prompts for entry by the user 14 of a challenge code entered by a recipient of the selected electronic gift card to authenticate that the selected electronic gift card is being accessed by the intended recipient. If the user 14 does not enter the challenge code, the prepaid instrument provider 18 blocks the user 14 from accessing the selected electronic gift card and does not add the selected electronic gift card to the electronic passbook. The challenge code represents an additional security measure to ensure that only those electronic gift cards actually intended for the recipient are added to the electronic passbook. The challenge code can include, for example, an email address of the recipient corresponding to the email address sent to the recipient with a uniform resource locator (URL) link to the selected electronic gift card.

The electronic passbook file can further include an image, such as a merchant's logo 504, associated with a merchant of a service or an item with whom the selected electronic gift card is redeemable. The electronic file can also include terms and conditions (accessible by the terms and conditions user interface control 528) associated with the redemption of the selected electronic gift card with the merchant, a card number 526, and a personal identification code (PIN) 526 associated with the selected electronic gift card. The electronic file can further include a third party URL link to a web page associated with the merchant. The electronic gift card balance, the recipient's name, the URL link, the logo 504, the terms and conditions, the card number, and the PIN can be stored on the prepaid instrument provider server 18 and associated by the prepaid instrument provider server 18 with the selected electronic gift card. These items of data are not controlled by the electronic device 12. The card number can be generated by the merchant at which the electronic gift card can be redeemed, and the identification code can be generated by the prepaid instrument provider server 18. However, the prepaid instrument provider server 18 causes the card number to be displayed by the web browser on the web page 502 or another web page (e.g., the web page 702 shown in FIG. 7) linked to the web page 502.

The prepaid instrument provider server can optionally add a terms and conditions user interface control 528 (e.g., a button control) to the web page 502 such that when the terms and conditions user interface control 528 is selected, the terms and conditions associated with the electronic gift card are displayed on the web page 502 or another web page 602, 702 linked to the web page 502. Alternately, the prepaid instrument provider server 18 can add the terms and conditions associated with the selected electronic gift card to the web page 502 (not shown). The terms and conditions are a legal document that specify the terms and conditions associated with the electronic gift card.

The electronic passbook, in various but not necessarily all aspects disclosed herein, stores or holds virtual instruments, which are used to interact with the physical world. Virtual instruments, in these examples, can include an electronic code, such as a barcode, that is sensed or scanned by a sensor to convert the electronic code to corresponding digital information indicative of the electronic code. In some examples, virtual instruments do not include bank account or credit card numbers. Virtual instruments that do not include bank account or credit card numbers can be prepaid instruments, which means that the value associated with the instrument has already been paid and entitles the bearer of the instrument to present the virtual instrument to a point-of-sale terminal or to a human for entry into a paid event (e.g., a charity event or a concert or sporting event ticket or the right to board a vessel such as a passenger ship or airplane) or to receive a service or an item in exchange for the value associated with the instrument (e.g., an electronic gift card or a stored value card), without having to provide any additional monetary funds. In some examples, virtual instruments differ from traditional digital wallets, which store sensitive bank account or credit card information, in that a virtual instrument does not include this information.

Figure 6:
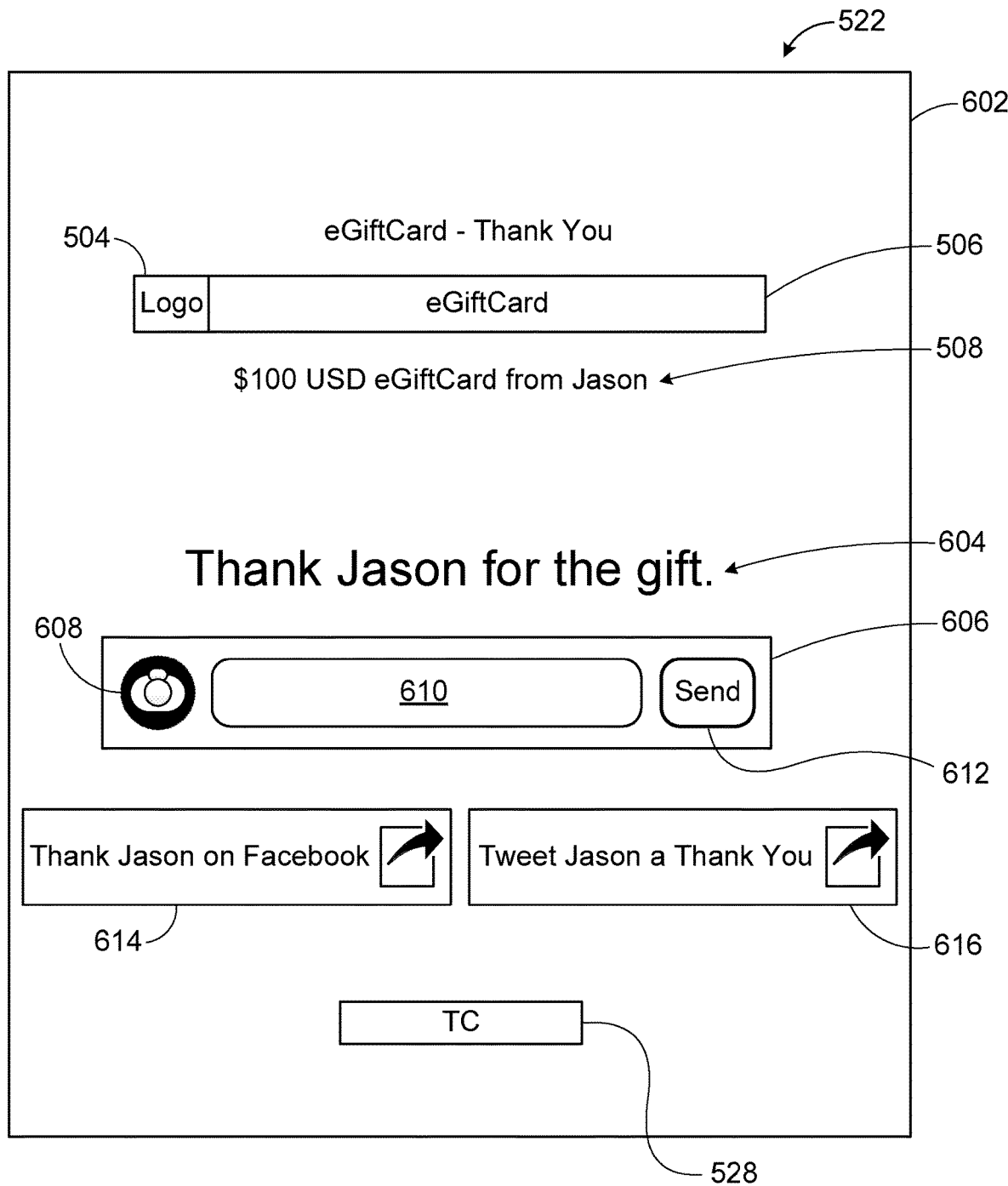
FIG. 6 is an example web page hosted and generated by the prepaid instrument provider server, which allows the recipient of an electronic gift card to thank the sender thereof.

Returning to FIG. 5, the prepaid instrument provider server 18 can include a second user interface control 522 (e.g., a button control) on the web page 502 prior to displaying the entire web page 502. This control 522 allows the user 14 to thank the sender of the electronic gift card. When the button control 522 is selected, a second web page 602 (shown in FIG. 6) linked to the web page 502 is displayed. The second web page 602 includes a camera user interface control 608, a text box user interface control 610, and a send user interface control 612. The camera user interface control 608 when selected permits a user 14 of the electronic device 12 to take a digital photograph, which the user 14 can send with a thank you note. The text box user interface control 610 accepts a text entry by the user 14, such as a thank you note. The send user interface control 612 when selected causes the prepaid instrument provider server 18 to instruct an email application residing on the electronic device 12 to send an email that includes the digital photograph (if taken by the user 14) and the text entry (e.g., a thank you note) to a sender of the selected electronic gift card. Additional button controls can be provided on the second web page 602, such as a social networking service button control 614 for thanking the sender on a social media website, such as FACEBOOK, and a second social networking service button control 616 for thanking the sender on a social networking service, such as TWITTER. The terms and conditions button control 528 can be displayed on the second web page 602. When selected, the prepaid instrument provider server 18, retrieves the requested terms and conditions associated with the selected electronic gift card and sends it to the web browser on the electronic device 12.

Images associated with a merchant or provider of the selected electronic gift card can be displayed on the web page 502, such as the merchant's logo 504. The merchant's logo 504 can be hosted on the prepaid instrument provider server or on the merchant's server that is controlled by the merchant and not by the prepaid instrument provider server 18 or by the electronic device 12. A faceplate image 510 selected by a sender of the selected electronic gift card can be included on the web page 502. The faceplate image 510 can correspond to any image that the sender desires to be shown on the electronic gift card, such as an image having a birthday theme.

Instead of adding the selected electronic gift card to the electronic passbook, the user 14 may desire to use the electronic gift card immediately. A button control 524 can be included on the web page 502, which when selected, causes a third web page 702 (shown in FIG. 7) to be displayed. Selecting the button control 524 indicates that the user 14 desires to use the selected electronic gift card. The original balance, the balance remaining, the card number of the selected electronic gift card, and the PIN number of the selected electronic gift card can also be displayed in the area 526 shown in FIG. 5.

Figure 7:
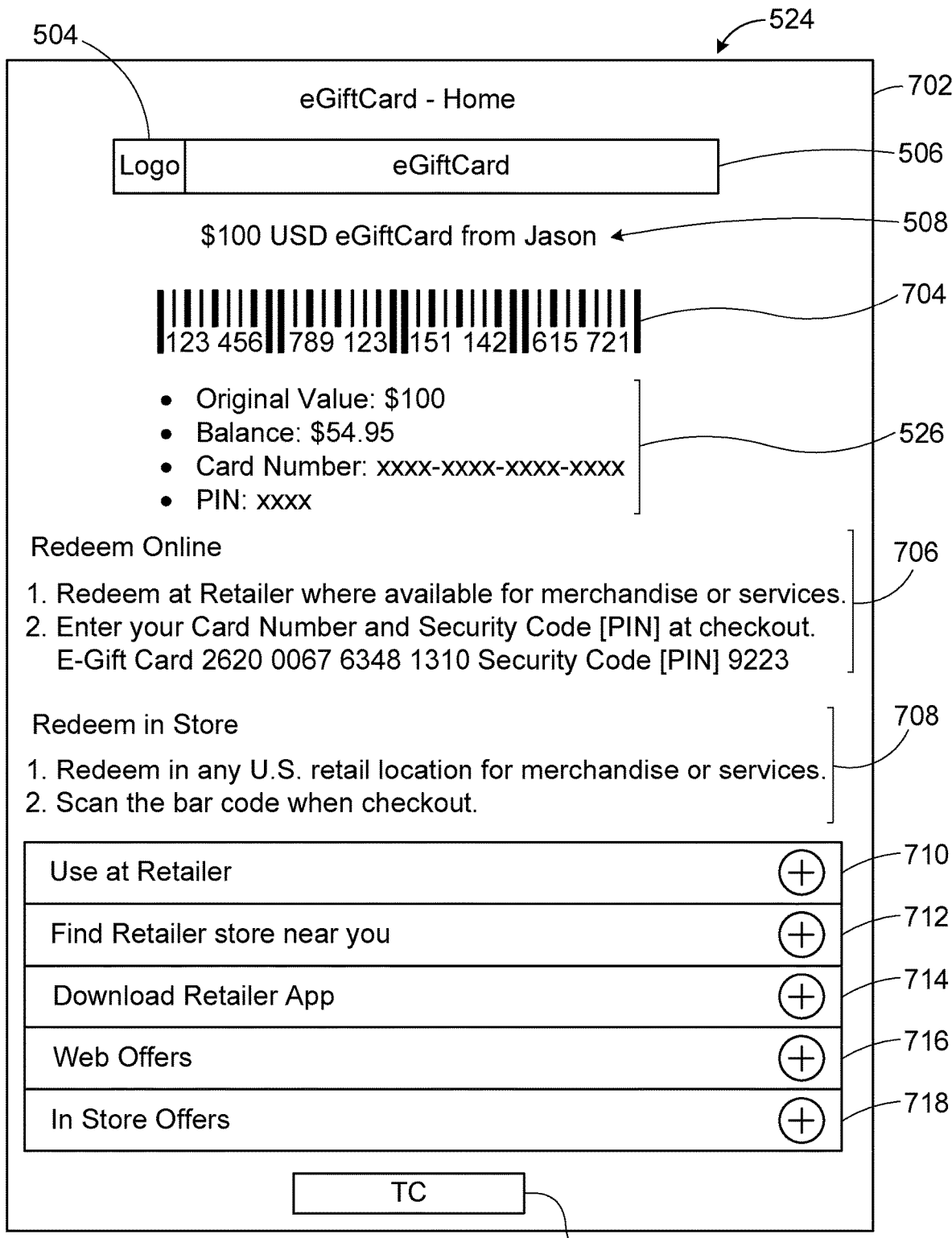
FIG. 7 is an example web page hosted and generated by the prepaid instrument provider server, which allows an authenticated recipient of the electronic gift card to redeem it online or at a retailer.

If the user 14 selects the button control 524, the third web page 702 is displayed. The web pages 502, 602, 702 are linked together. As used herein, "a web page" can include one or more web pages linked together, such as by uniform resource locators, to form a collection of linked web pages. The web pages 502, 602, 702 can include an indicium 508 indicating the amount of the selected electronic gift card and the name of the sender, along with the merchant's logo 504, and indication 506 that the selected electronic gift card is an electronic gift card (as opposed to, for example, a stored value or loyalty card, so as not to confuse the user 14), and the terms and conditions interface control button 528. Referring to FIG. 7, the third web page 702 includes a barcode 704, which can correspond to the barcode 514 if displayed on the web page 502, associated with the electronic gift card. A merchant can scan this barcode 704 at a point of sale (POS) terminal to complete a sales transaction using the remaining balance (in this example $54.95) selected electronic gift card to fund part or all of the purchase of an item or service. Alternately, the device 12 can include a near-field communication (NFC) module for transmitting at least the card number and PIN number associated with the selected electronic gift card. Indicia 706 can indicate an online method that the user 14 can redeem the selected electronic gift card online and displays the card number and PIN associated with the selected electronic gift card in case the same needs to be manually inputted into a POS terminal.

Indicia 708 on the third web page 702 can indicate an in-store method that the user 14 can redeem the selected electronic gift card for an item or a service with instructions for scanning the barcode 704 at checkout.

One or more of the following user interface controls can also be provided on the third web page by the prepaid instrument provider server 18. A button control 710 allows the user 14 to redeem the selected electronic gift card at a retailer, such as at a brick-and-mortar store or kiosk. A button control 712 allows the user 14 to find a retailer near the physical location of the user 14 using the electronic device's 12 geolocation capabilities. A button control 714 allows the user 14 to download a software application (colloquially referred to as an "app" when used on smartphones or tablet computing devices) released or controlled by the retailer to the electronic device 12. A button control 716 allows the user 14 to see if there are any online offers offered by the merchant associated with the selected electronic gift card that can be used with the selected electronic gift card for a purchase of an item or a service offered by the retailer/merchant. A button control 718 allows the user 14 to see whether there are any in-store (e.g., at a brick-and-mortar or kiosk location of the merchant) offers offered by the merchant associated with the selected electronic gift card that can be used in the store or at the kiosk together with the selected electronic gift card for a purchase of an item or a service offered by the retailer/merchant.

Aspects of this disclosure can be implemented, in some embodiments, through a computer-executable program of instructions, such as program modules, generally referred to as software applications or application programs executed by a computer. The software can include, in non-limiting examples, routines, programs, objects, components, and data structures that perform particular tasks or implement particular abstract data types. The software forms an interface to allow a computer to react according to a source of input. The software can also cooperate with other code segments to initiate a variety of tasks in response to data received in conjunction with the source of the received data. The software can be stored on any of a variety of memory media, such as CD-ROM, magnetic disk, bubble memory, and semiconductor memory (e.g., various types of RAM or ROM).

Moreover, the numerous aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network. In a distributed-computing environment, program modules can be located in both local and remote computer-storage media including memory storage devices. Aspects of the present disclosure can therefore, be implemented in connection with various hardware, software or a combination thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it can be implemented by an application specific integrated circuit (ASIC), a programmable logic device (PLD), a field programmable logic device (FPLD), discrete logic, etc.). Also, some or all of the machine readable instructions represented in any flowchart depicted herein can be implemented manually. Further, although specific algorithms are described with reference to flowcharts depicted herein, persons of ordinary skill in the art will readily appreciate that many other methods of implementing the example machine readable instructions can alternatively be used. For example, the order of execution of the blocks can be changed, and/or some of the blocks described can be changed, eliminated, or combined.

It should be noted that the algorithms illustrated and discussed herein as having various modules or blocks that perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

Implementations

Implementation 1. A method of storing on a portable electronic device an electronic gift card issued by a prepaid instrument provider, the method comprising: receiving, at a server of the prepaid instrument provider, a request from a web browser running on a portable electronic device for a web page hosted by the prepaid instrument provider server, the request including a uniform resource locator (URL) associated with a selected electronic gift card selected from a plurality of electronic gift cards stored on the prepaid instrument provider server, the selected electronic gift card being associated with a unique identification code, a balance of an amount of value remaining on the selected electronic gift card, a name of a sender of the selected electronic gift card, and a URL link to the selected electronic gift card stored on the prepaid instrument provider server; the prepaid instrument provider server sending to the web browser running on the portable electronic device the web page hosted by the server, the web page including a user interface control that is configured, when selected, to cause a representation of the selected electronic gift card to be added to an electronic passbook on the portable electronic device; responsive to the prepaid instrument provider server receiving an indication of a selection of the user interface control, receiving by the prepaid instrument provider sever from the web browser the unique identification code associated with the selected electronic gift card; responsive to receiving the unique identification code, the prepaid instrument provider server creating an electronic passbook file that includes the balance, the name of the sender, and the URL associated with the selected electronic gift card; and the prepaid instrument provider server communicating to the web browser the electronic passbook file as the representation of the selected electronic gift card for adding the representation of the selected electronic gift card to the electronic passbook on the portable electronic device.

Implementation 2. The method of implementation 1, wherein the selected electronic gift card is associated with a merchant operating separately from the prepaid instrument provider.

Implementation 3. The method of claim implementation 1, wherein the representation of the selected electronic gift card includes branding information unique to the merchant.

Implementation 4. The method of implementation 2, wherein the representation of the selected electronic gift card includes pre-established terms and conditions for using the selected electronic gift card.

Implementation 5. The method of implementation 2, wherein the representation of the selected electronic gift card includes a hyperlink to a webpage hosted by the merchant.

Implementation 6. The method of implementation 1, further comprising determining whether the portable electronic device includes the electronic passbook prior to communicating to the web browser the electronic passbook file as the representation of the selected electronic gift card.

Implementation 7. The method of implementation 6, wherein the determining whether the portable electronic device includes the electronic passbook comprises ascertaining at least a device make and model of the portable electronic device.

Implementation 8. The method of implementation 6, wherein the determining whether the portable electronic device includes the electronic passbook comprises ascertaining if the portable electronic device is JavaScript enabled.

Implementation 9. The method of implementation 6, wherein the determining whether the portable electronic device includes the electronic passbook comprises ascertaining an operating system type and a version of the operating system on the portable electronic device.

Implementation 10. The method of implementation 6, wherein the determining whether the portable electronic device includes the electronic passbook comprises ascertaining a browser type and a version of the web browser running on the portable electronic device.

Implementation 11. The method of implementation 1, wherein the electronic passbook file is created dynamically after the prepaid instrument provider server receives the indication of the selection of the user interface control.

Implementation 12. The method of implementation 1, wherein the communicating includes the electronic passbook file being automatically downloaded from the web browser into the electronic passbook on the portable electronic device.

Implementation 13. The method of implementation 1, wherein the prepaid instrument provider server also associates a card number with the selected electronic gift card, the card number being distinct from the unique identification code.

Implementation 14. The method of implementation 1, wherein the electronic passbook file also includes a card number, a merchant, and a personal identification number (PIN), all of which are associated with the selected electronic gift card.

Implementation 15. The method of implementation 1, wherein the electronic passbook is operable to store electronic travel tickets, electronic entertainment event tickets, electronic pre-paid value cards, electronic loyalty cards, or electronic coupons, or any combination thereof.

Implementation 16. The method of implementation 1, wherein the electronic passbook is characterized, at least in part, by not being operable to store bank account information or credit card information.

Implementation 17. The method of implementation 1, wherein the electronic passbook is a dedicated mobile device application saved on the portable electronic device.

Implementation 18. A computer program product comprising one or more non-transient computer-readable media including instructions which, when executed by one or more processors of a prepaid instrument provider, cause the one or more processors to operate with one or more servers of the prepaid instrument provider to: receive a request from a web browser running on a portable electronic device for a web page hosted by the prepaid instrument provider, the request including a uniform resource locator (URL) associated with an electronic gift card selected from a plurality of electronic gift cards stored on the one or more servers of the prepaid instrument provider, the selected electronic gift card being associated with a unique identification code, a balance remaining on the selected electronic gift card, a sender of the selected electronic gift card, and a URL link to the selected electronic gift card stored on the one or more servers of the prepaid instrument provider; send to the web browser running on the portable electronic device the web page which includes a user interface control that is configured, when selected, to cause a representation of the selected electronic gift card to be added to an electronic passbook on the portable electronic device; responsive to receiving an indication of a selection of the user interface control, receive from the web browser the unique identification code associated with the selected electronic gift card; responsive to receiving the unique identification code, create an electronic passbook file that includes the balance, the sender, and the URL associated with the selected electronic gift card; and communicate to the web browser the electronic passbook file as the representation of the selected electronic gift card for adding the representation of the selected electronic gift card to the electronic passbook on the portable electronic device.

Implementation 19. A method of importing to a portable electronic device an electronic gift card issued by a prepaid instrument provider, the method comprising: receiving an indication confirming a purchase of an electronic gift card selected from a plurality of electronic gift cards stored on a server of the prepaid instrument provider; in response to receiving the indication confirming the purchase, the prepaid instrument provider server associating with the selected electronic gift card at least a unique identification code, an amount of value of the selected electronic gift card, and a uniform resource locator (URL) link to the selected electronic gift card stored on the prepaid instrument provider server; transmitting an electronic notification of the purchase to an intended recipient; receiving from the intended recipient, at the prepaid instrument provider server, a request with the URL link associated with the selected electronic gift card; the prepaid instrument provider server sending to a web browser running on a portable electronic device of the recipient a web page with a user-selectable control that is operable, when selected, to automatically export a representation of the selected electronic gift card into an electronic passbook on the portable electronic device; responsive to the prepaid instrument provider server receiving an indication of a selection of the user-selectable control, determining the unique identification code of the selected electronic gift card; from the unique identification code, creating an electronic passbook file that includes the amount of value and the URL link of the selected electronic gift card; and the prepaid instrument provider server communicating to the portable electronic device the electronic passbook file as the representation of the selected electronic gift card and an instruction to automatically import the representation of the selected electronic gift card into the electronic passbook on the portable electronic device.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A computer-implemented method for storing a selected virtual prepaid instrument on a portable electronic device, the method comprising:

receiving, by at least one server of one or more host servers, a request from a web browser running on the portable electronic device for a web page hosted by the one or more host servers through which the selected virtual prepaid instrument to be stored on the portable electronic device is accessed, the request including a uniform resource locator (URL) associated with the selected virtual prepaid instrument, the selected virtual prepaid instrument including at least a unique electronic code;

determining, by at least one server of the one or more host servers, and in response to receiving the request for the web page through which the selected virtual prepaid instrument to be stored is accessed, which one of at least two configurations is present on the portable electronic device based, at least in part, on an analysis of a header of the request from the web browser running on the portable electronic device, a first of the at least two configurations being that a dedicated mobile software application configured to store virtual prepaid instruments is present on the portable electronic device, the dedicated mobile software application configured to store the virtual prepaid instruments without storing any bank account or credit card numbers in the form of electronic passbook files, and a second of the at least two configurations being that the dedicated mobile software application configured to store virtual prepaid instruments is not present on the portable electronic device, the analysis of the header including an analysis of a version of an operating system running on the portable electronic device, a device type of the portable electronic device, or a browser type of the web browser running on the portable electronic device;

responsive to the determining that the portable electronic device has the first configuration:

dynamically constructing a first web page before the web page is transmitted to the portable electronic device by generating, by at least one server of the one or more host servers, a selectable user interface control associated with the selected virtual prepaid instrument to be stored and adding the generated user interface control to the first web page;

transmitting, by at least one server of the one or more host servers, the first web page including the selectable user interface control associated with the selected virtual prepaid instrument to be stored, to the web browser running on the portable electronic device;

creating, by at least one server of the one or more host servers, and in response to receiving an indication of a selection of the selectable user interface control on the first web page, a unique electronic passbook file associated with the selected virtual prepaid instrument to be stored; and causing, by at least one server of the one or more host servers, and based on a transmission of the unique electronic passbook file to the portable electronic device, an indexing of the unique electronic passbook file by the dedicated mobile software application as a representation of the selected virtual prepaid instrument on the portable electronic device; and responsive to the determining that the portable electronic device has the second configuration:

generating, by at least one server of the one or more host servers, a unique displayable electronic code associated with the selected virtual prepaid instrument to be stored for display on a second web page and adding the unique displayable electronic code to the second web page for display thereon;

transmitting, by at least one server of the one or more host servers, the second web page including the unique displayable electronic code associated with the selected virtual prepaid instrument to be stored to the web browser running on the portable electronic device; and causing, by at least one server of the one or more host servers, the unique displayable electronic code to be displayed on the second web page by the web browser in response to downloading the second web page to the portable electronic device.

2. The method of claim 1, wherein, responsive to the determining that the portable electronic device has the first configuration, the at least one server of the one or more host servers transmitting, to the portable electronic device, the unique electronic passbook file as the representation of the virtual instrument and an instruction directing the portable electronic device to automatically import the unique electronic passbook file into the dedicated mobile software application on the portable electronic device.

* * * * *